INVENTOR.
Ernest J. Svenson
By: Olson & Tresler attys

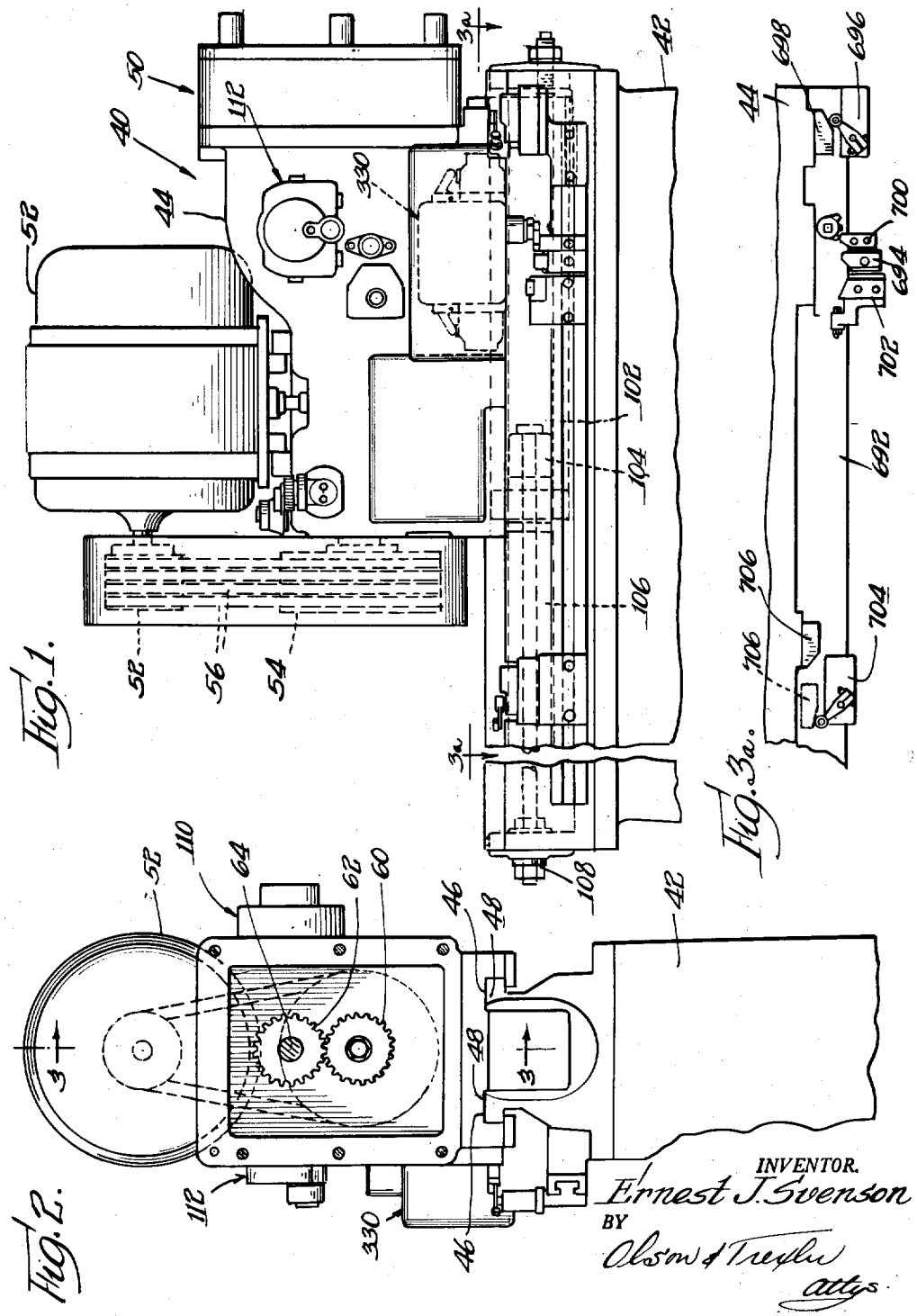

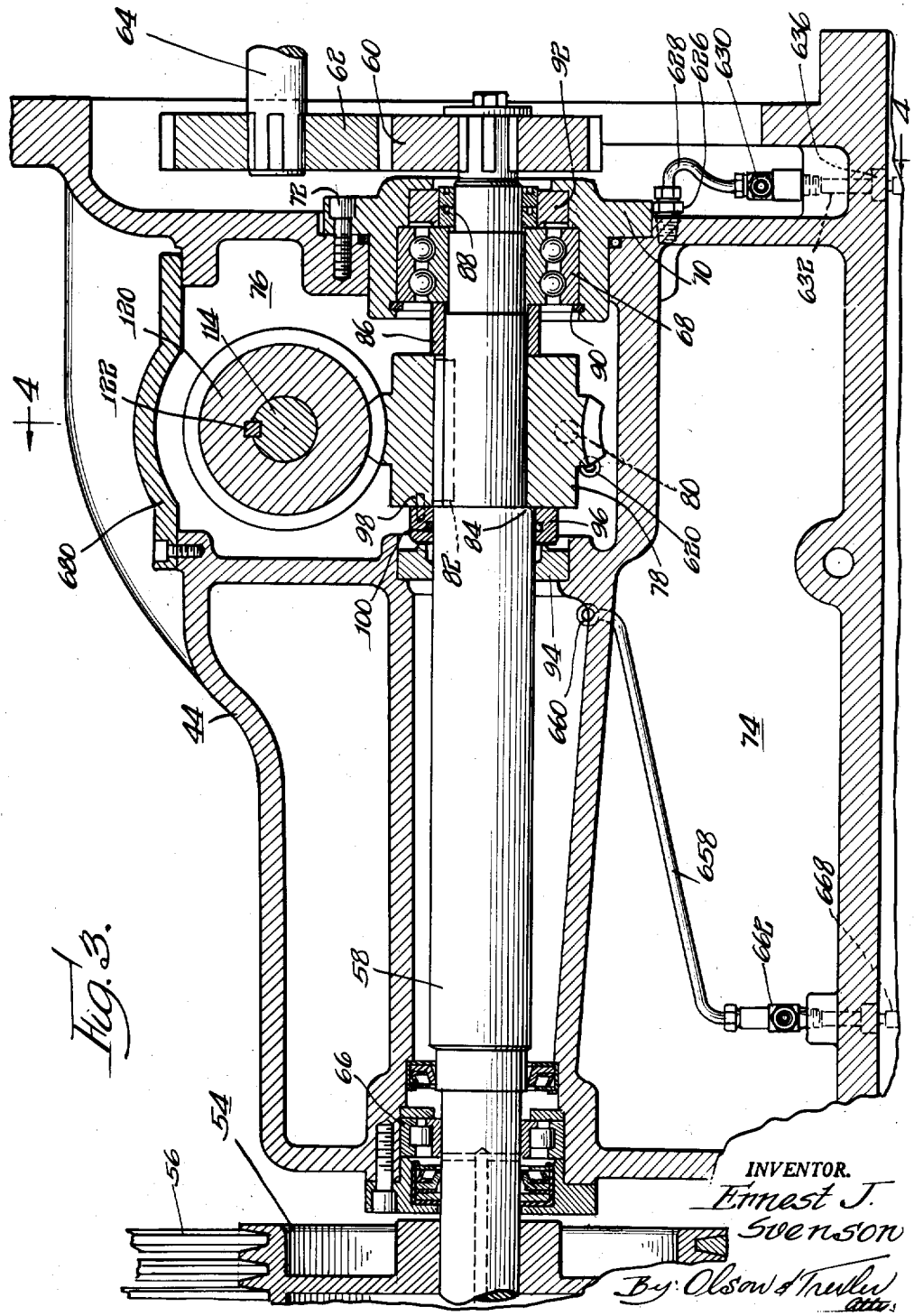

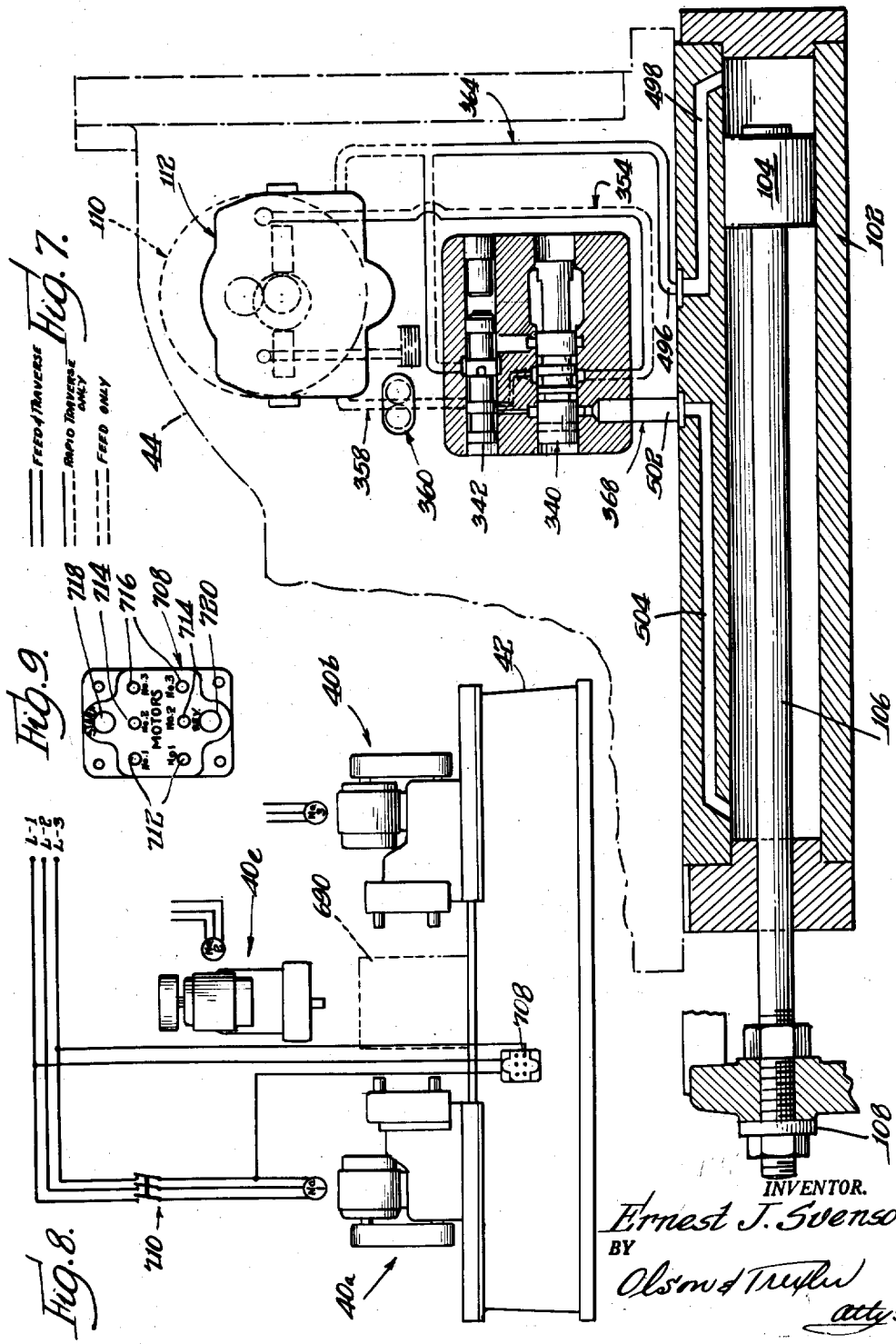

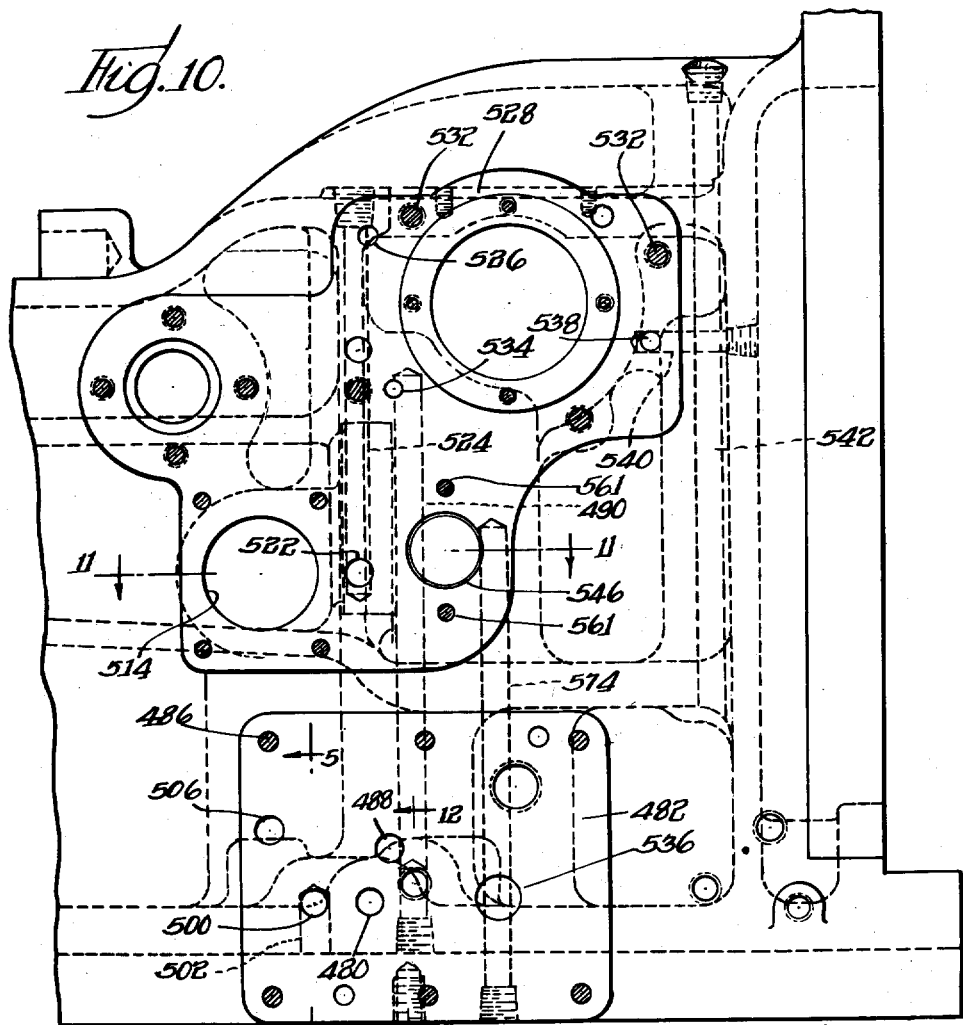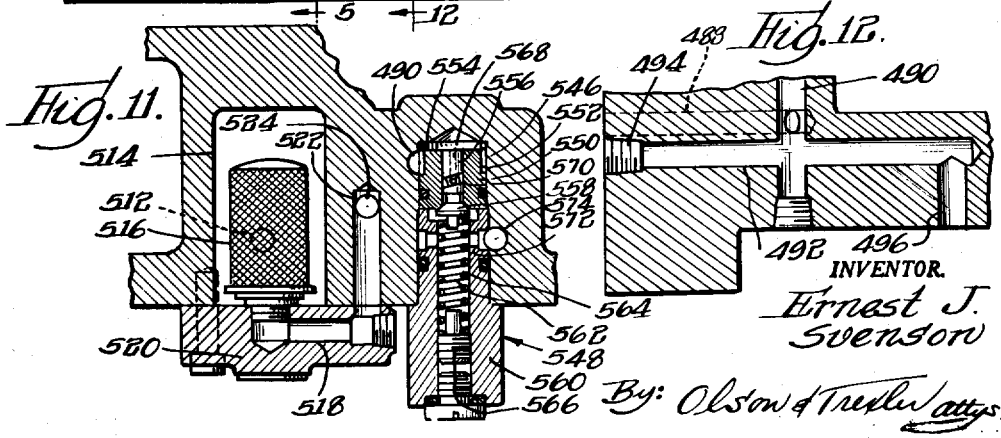

Jan. 19, 1960   E. J. SVENSON   2,921,437
MATERIAL WORKING APPARATUS
Filed June 16, 1954   16 Sheets-Sheet 7
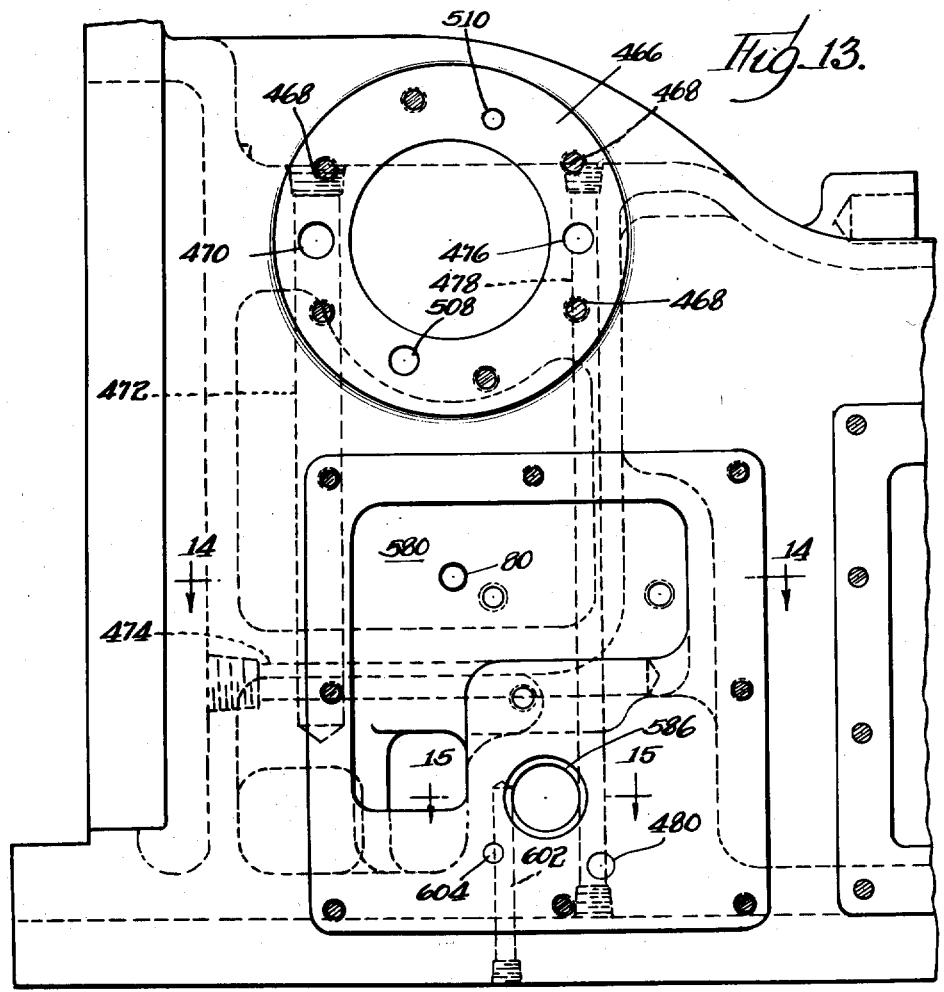
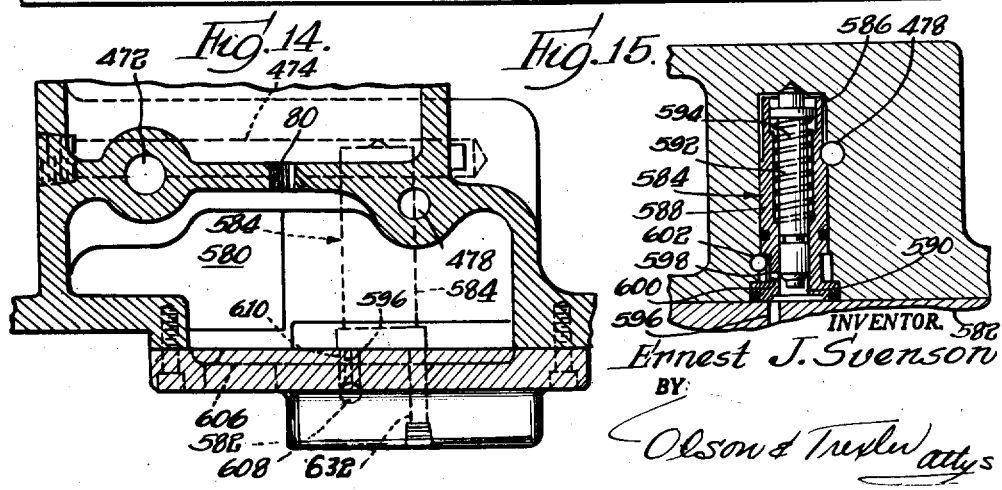
INVENTOR.
Ernest J. Svenson
BY
Olson & Trexler attys

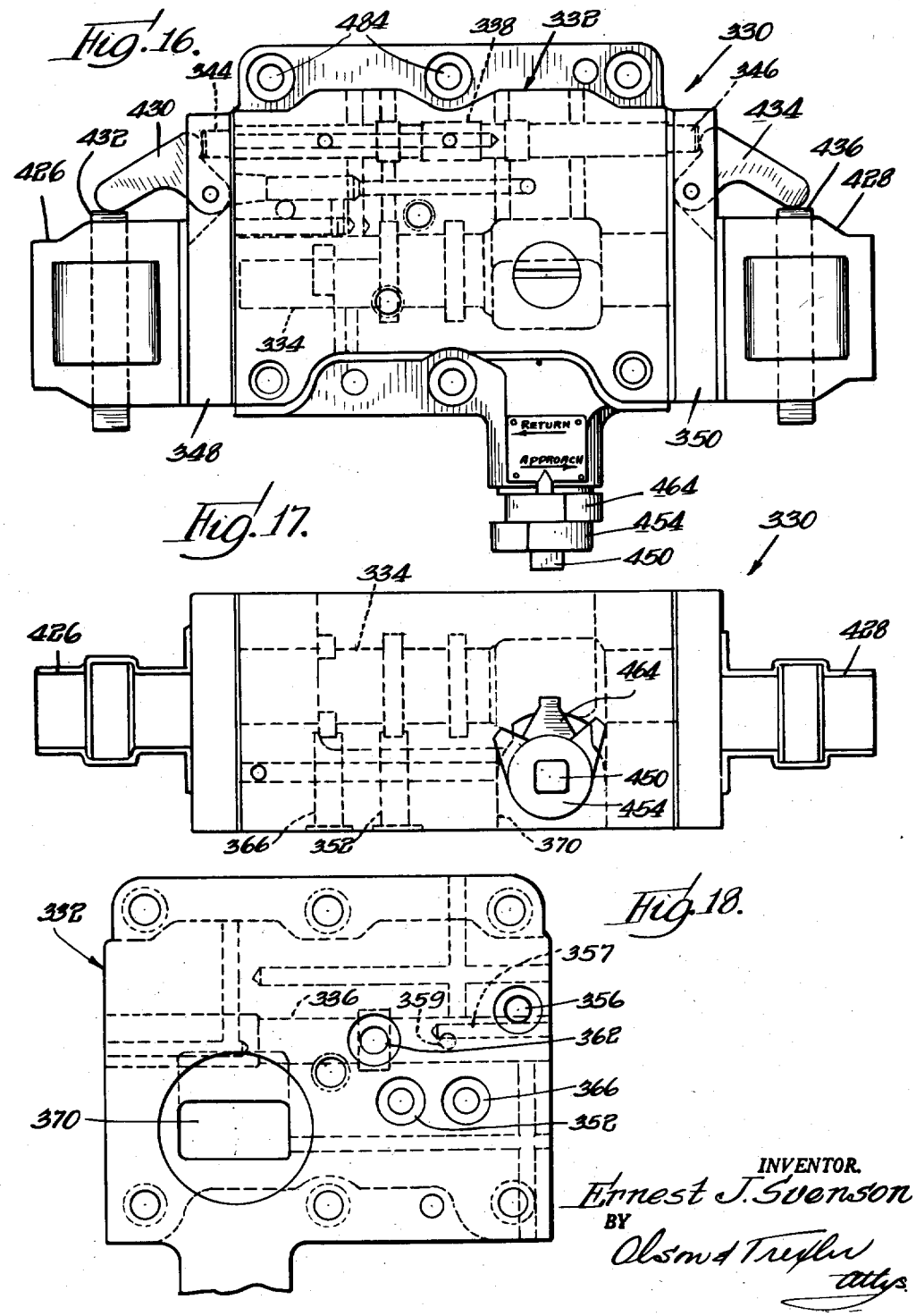

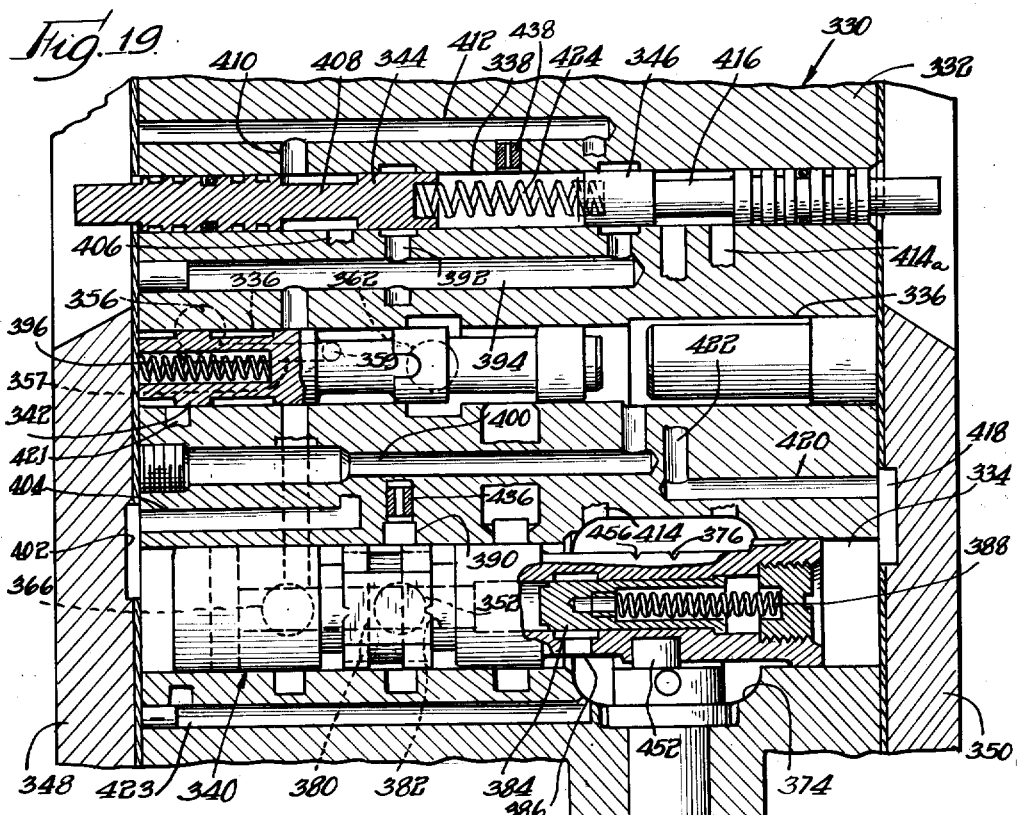
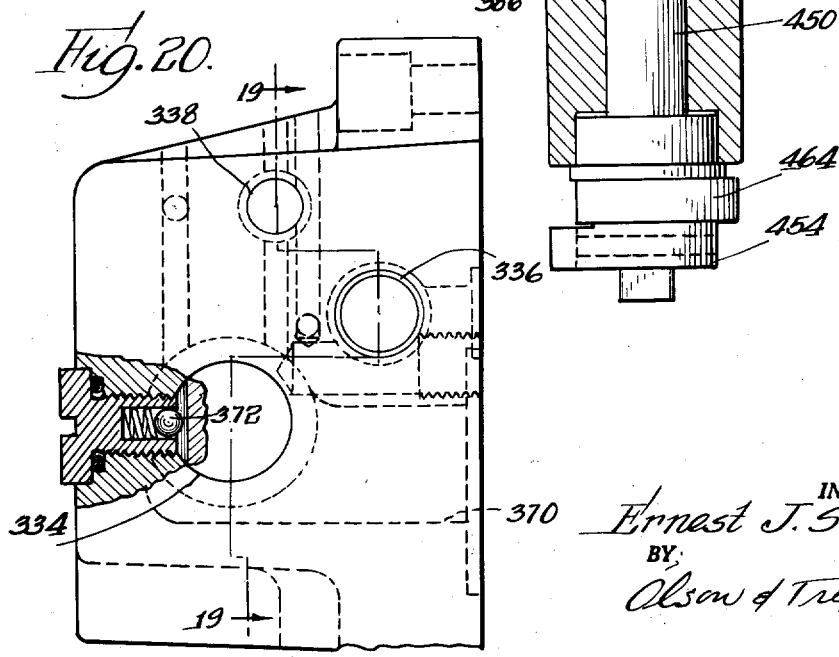

INVENTOR.
Ernest J. Svenson
By: Olson & Trexler attys

Jan. 19, 1960      E. J. SVENSON      2,921,437

MATERIAL WORKING APPARATUS

Filed June 16, 1954      16 Sheets-Sheet 11

INVENTOR.
Ernest J. Svenson
By: Olson & Trexler Attys.

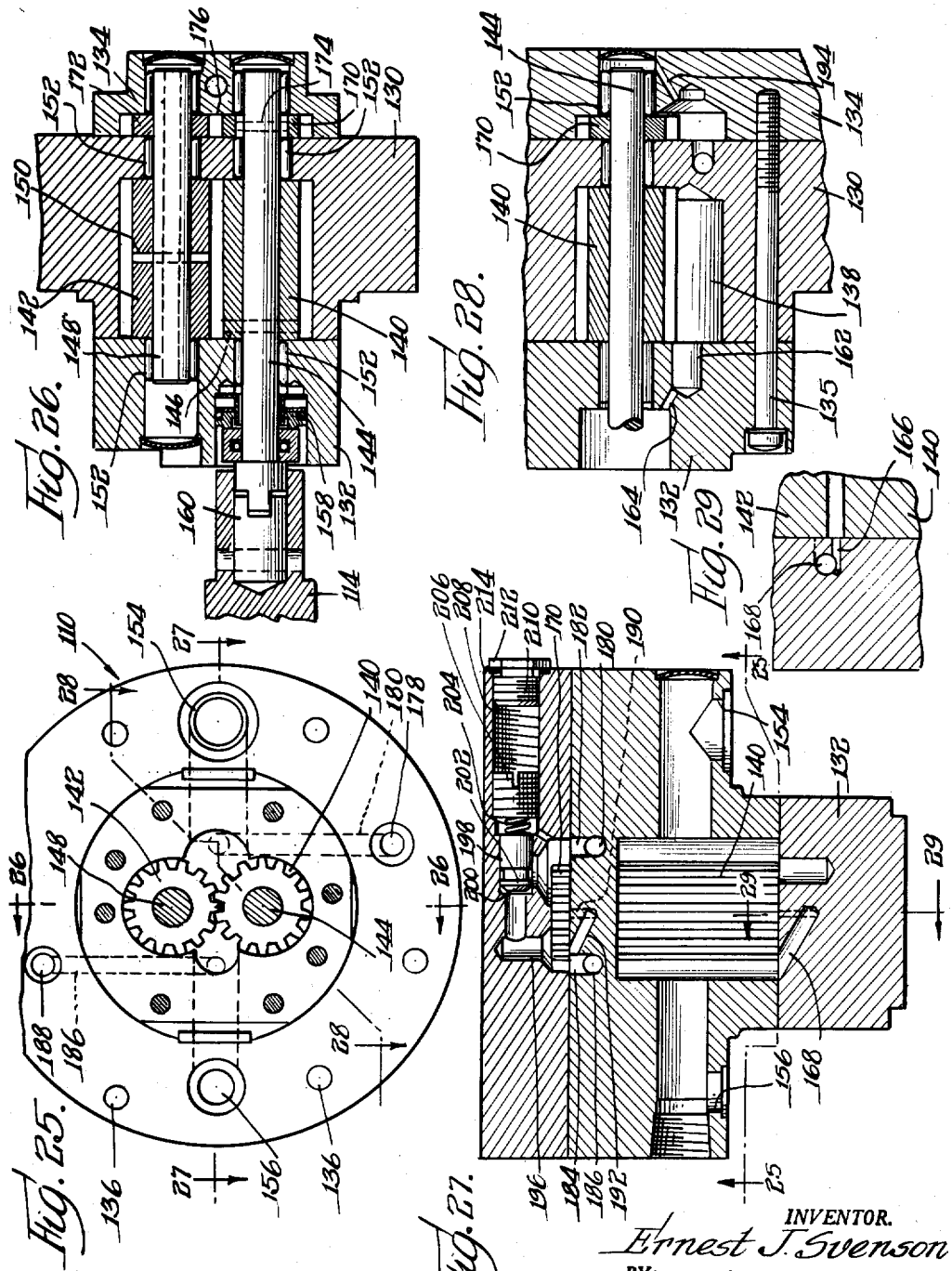

Jan. 19, 1960 E. J. SVENSON 2,921,437
MATERIAL WORKING APPARATUS
Filed June 16, 1954 16 Sheets-Sheet 13
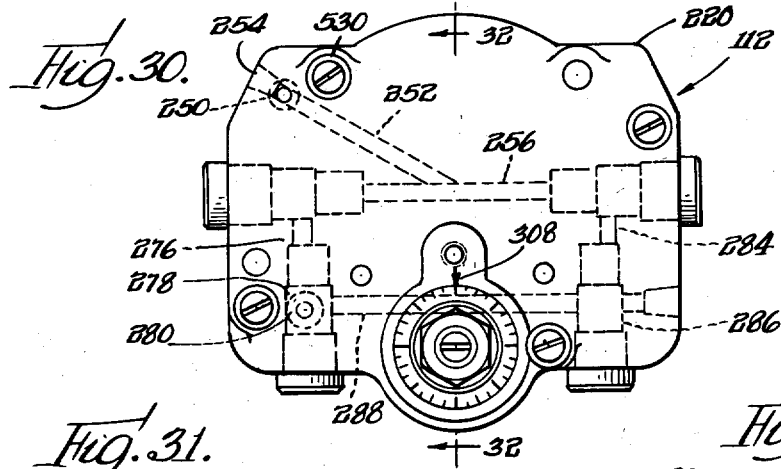
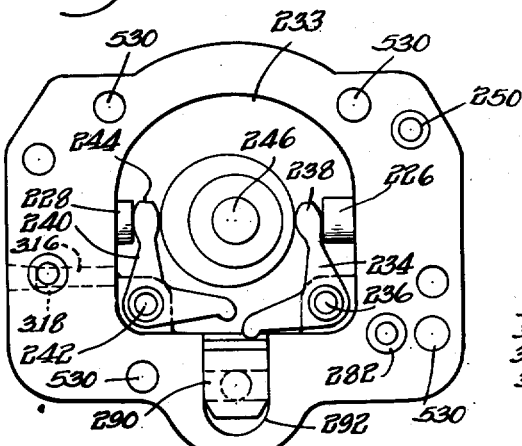
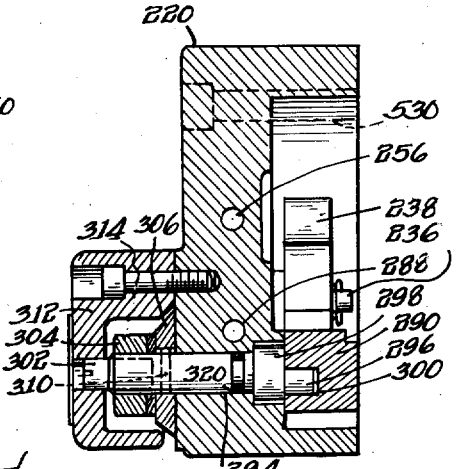
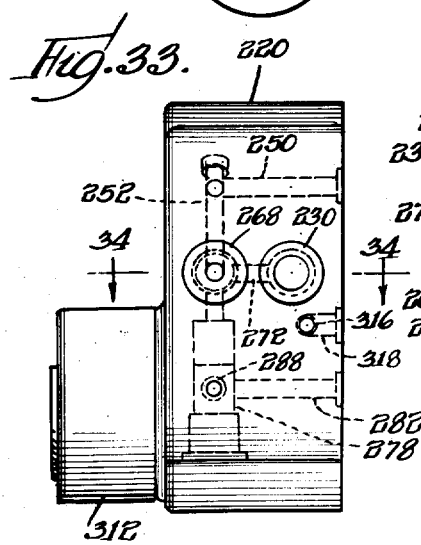
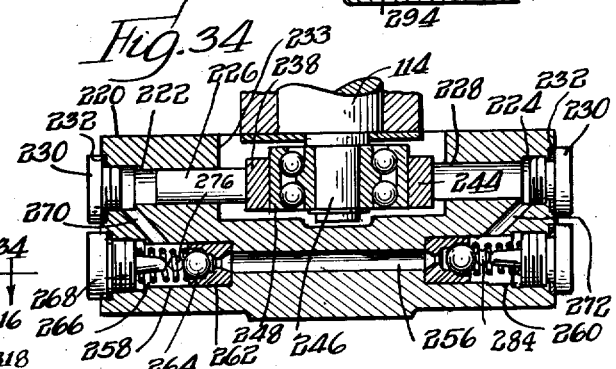
INVENTOR.
Ernest J. Svenson
BY
Olson & Trexler
Attys.

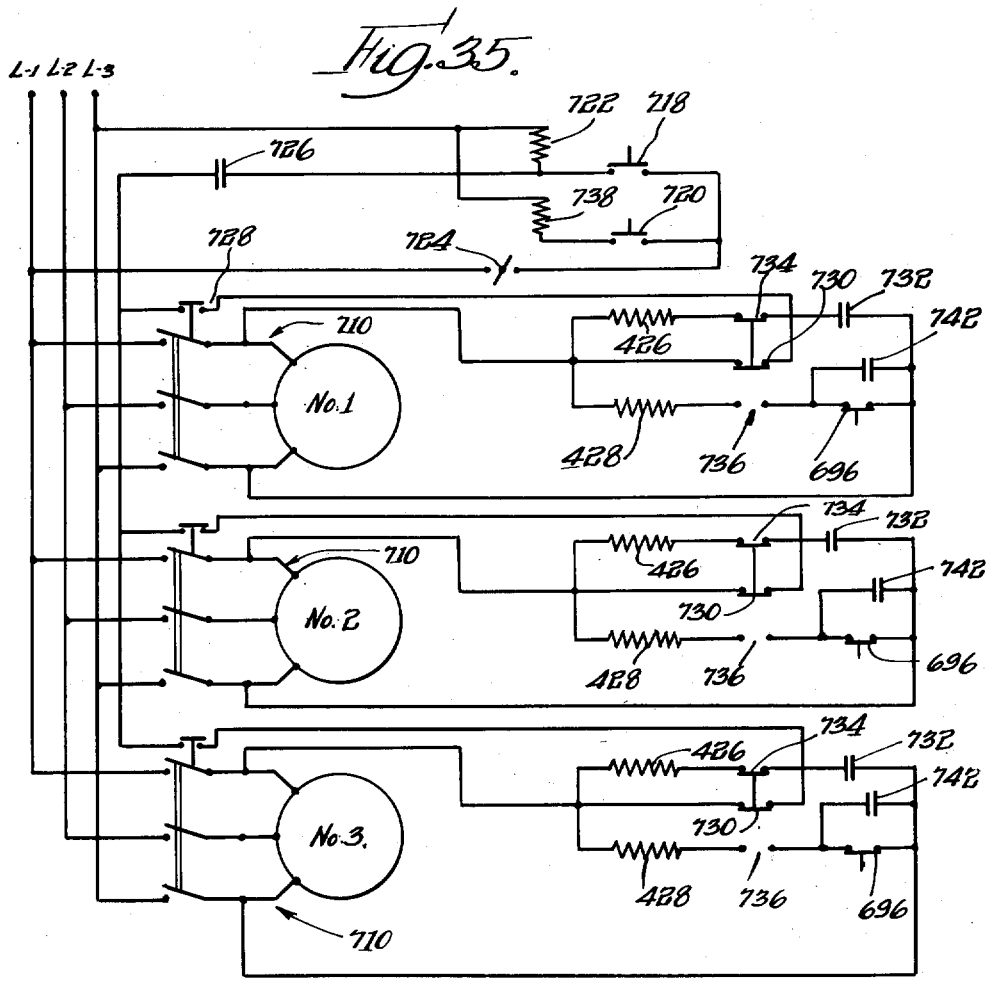

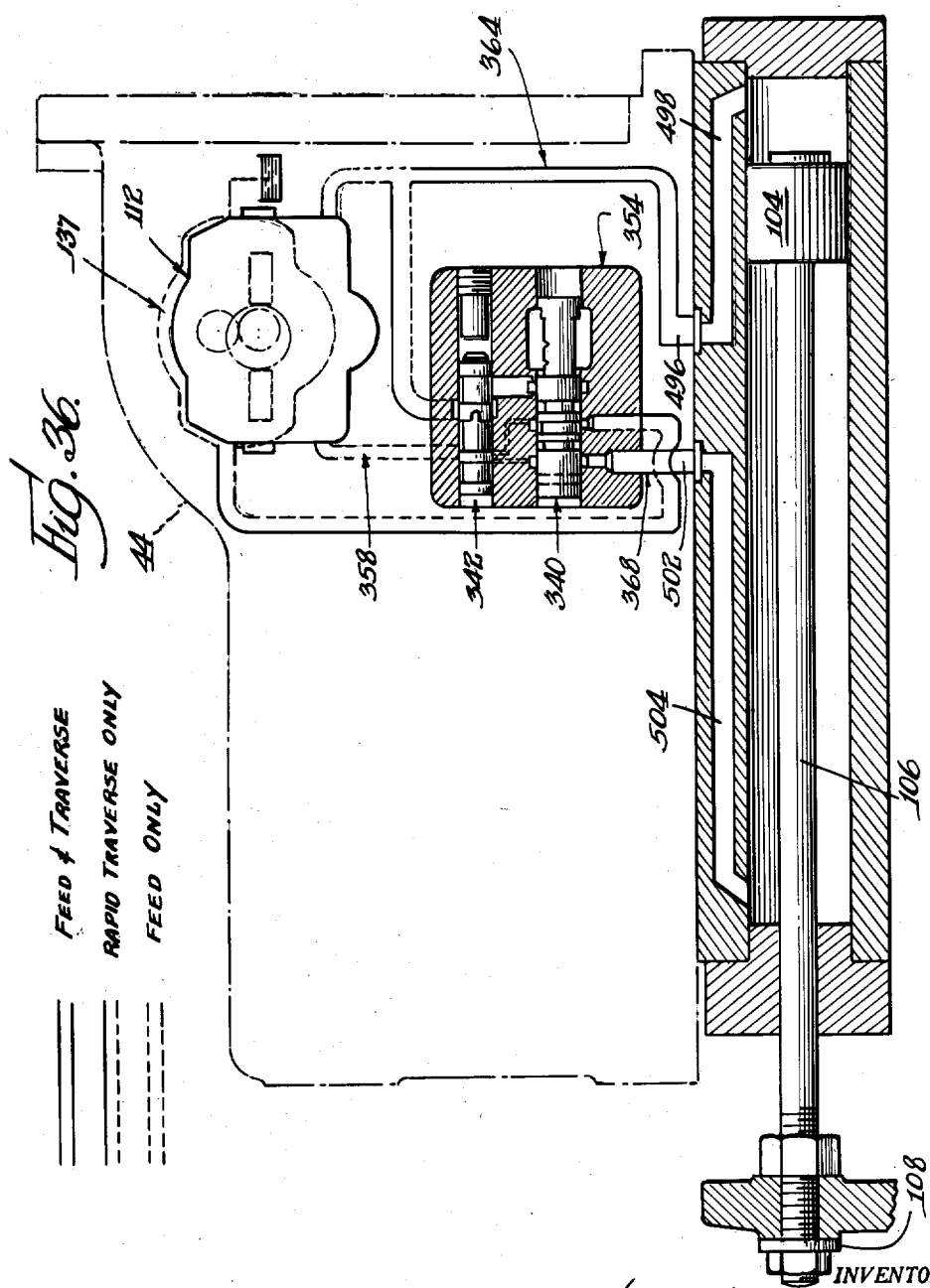

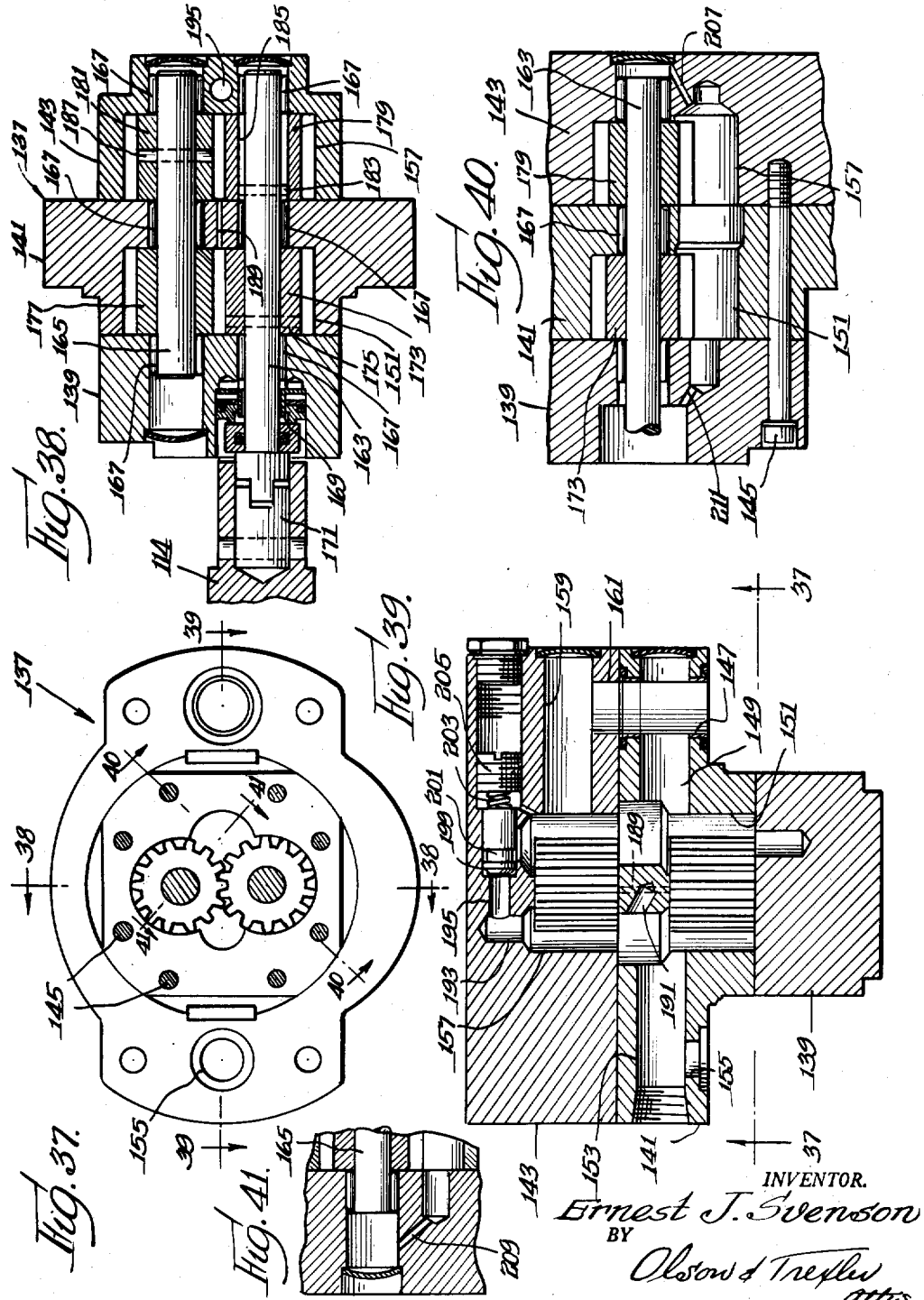

United States Patent Office 2,921,437
Patented Jan. 19, 1960

2,921,437

MATERIAL WORKING APPARATUS

Ernest J. Svenson, Rockford, Ill.

Application June 16, 1954, Serial No. 437,067

8 Claims. (Cl. 60—52)

The present invention relates generally to a novel metal working apparatus and more particularly to a novel apparatus of the type generally referred to as a self contained machine tool unit.

Metal working apparatus is often quite complex especially when used in a heavy industry such as the automobile industry and such apparatus usually includes complicated control means including hydraulic and electrical elements. It is common practice to employ groups of skilled electricians, machine repair men, tool makers, hydraulic servicemen, fixture repair men and the like to maintain and repair the apparatus and the efficiency of such servicemen has often been impaired, not only by the complex nature of the apparatus, but also by the fact that it is sometimes necessary for one group of servicemen to have the assistance of another group as a result of the arrangement of the apparatus elements. Thus, maintenance costs are often unduly excessive and in addition, valuable production time is often wasted since the several groups of servicemen cannot function or do their work independently of one another with the greatest efficiency. Therefore, it is an important object of the present invention to provide a novel metal working apparatus which is of simplified construction and wherein the various elements are arranged so that the apparatus may be maintained and repaired by various groups of skilled servicemen with increased efficiency.

Another object of the present invention is to provide a novel metal working apparatus or self contained machine tool unit having a hydraulic control system constructed and arranged so that there are a minimum of external conduits and couplings whereby the apparatus may be operated and maintained more efficiently.

Still another object of the present invention is to provide an apparatus of the above described type with a hydraulic control system having novel pump means of simplified construction whereby to promote more efficient operation and ease of maintenance.

A further object of the present invention is to provide a novel apparatus of the above described type which includes a hydraulic control system having improved control valve means which may be mounted and operated in a simple and efficient manner for directing hydraulic fluid from suitable pump means to cause reciprocating movement of a machine element and for causing a slower feeding movement of the machine element.

A still further object of the present invention is to provide a novel apparatus or self contained machine tool unit with a simple and efficient lubricating system which insures adequate lubrication of the apparatus ways and continuous lubrication of drive means for the pump means of the hydraulic control system.

A more specific object of the present invention is to provide a novel apparatus as set forth above which includes an improved rapid traverse hydraulic pump that also serves to pressurize or energize a feed oil pump.

Another specific object of the present invention is to provide an apparatus of the above described type having a novel feed pump of simplified construction which feed pump may be readily adjusted to vary the feed rate of a machine element.

Other and more detailed objects and advantages of the present invention will become apparent from the following description and the accompanying drawings wherein:

Fig. 1 is a side elevational view of an apparatus embodying the novel features of the present invention;

Fig. 2 is a right hand end elevational view of the apparatus shown in Fig. 1;

Fig. 3 is an enlarged fragmentary cross sectional view taken along line 3—3 in Fig. 2;

Fig. 3a is a cross sectional view taken along line 3a—3a in Fig. 1;

Fig. 7 is a semi-diagrammatic view of the sliding head and fluid circuits supported thereby;

Fig. 8 is an elevational view of a machine tool arrangement with a plurality of self contained machine tool units and with the electrical circuit arrangement partially shown;

Fig. 9 is an enlarged elevational view of the electric circuit control panel;

Fig. 10 is an enlarged fragmentary front elevational view of the sliding head casting of the apparatus shown in Fig. 1;

Fig. 11 is a fragmentary cross sectional view taken along line 11—11 in Fig. 10 and further showing a relief valve and filter mounted in the sliding head casting;

Fig. 12 is an enlarged fragmentary cross sectional view taken along line 12—12 in Fig. 10;

Fig. 13 is an enlarged fragmentary side elevational view showing the back side of the sliding head casting of the apparatus shown in Fig. 1;

Fig. 14 is a fragmentary cross sectional view taken along line 14—14 in Fig. 13;

Fig. 15 is a fragmentary cross sectional view taken along line 15—15 in Fig. 13 and further showing the lubricating oil pump of this invention mounted in the sliding head casting;

Fig. 16 is a side elevational view of the novel control valve of the present invention;

Fig. 17 is a bottom view of the control valve shown in Fig. 16;

Fig. 18 is a rear view of the novel control valve shown in Fig. 16;

Fig. 19 is a somewhat diagrammatic cross sectional view of the novel control valve taken along line 19—19 in Fig. 20;

Fig. 20 is an end elevational view of the novel control valve;

Fig. 25 is an enlarged cross sectional view of the novel rapid traverse pump and precharging pump structure taken along line 25—25 in Fig. 27;

Fig. 26 is a cross sectional view taken along line 26—26 in Fig. 25;

Fig. 27 is a cross sectional view taken along line 27—27 in Fig. 25;

Fig. 28 is a fragmentary cross sectional view taken along line 28—28 in Fig. 25;

Fig. 29 is a fragmentary cross sectional view taken along line 29—29 in Fig. 27;

Fig. 30 is a front elevational view of the novel feed pump of this invention;

Fig. 31 is a rear elevational view of the novel feed pump;

Fig. 32 is a cross sectional view taken along line 32—32 in Fig. 30;

Fig. 33 is an end elevational view of the novel feed pump;

Fig. 34 is a cross sectional view taken along line 34—34 in Fig. 33;

Fig. 35 is a diagrammatic illustration of the electrical circuit of the apparatus;

Fig. 36 is a semi-diagrammatic view of the sliding head and a slightly modified fluid circuit supported thereby;

Fig. 37 is a cross sectional view taken along line 37—37 in Fig. 39 and showing another form of a novel rapid traverse pump which may be used in the structure of this invention and more particularly, which may be used in the structure shown in Fig. 36;

Fig. 38 is a cross sectional view taken along line 38—38 in Fig. 37;

Fig. 39 is a cross sectional view taken along line 39—39 in Fig. 37;

Fig. 40 is a cross sectional view taken along line 40—40 in Fig. 37; and

Fig. 41 is a fragmentary cross sectional view taken along line 41—41 in Fig. 37.

Figure 4:
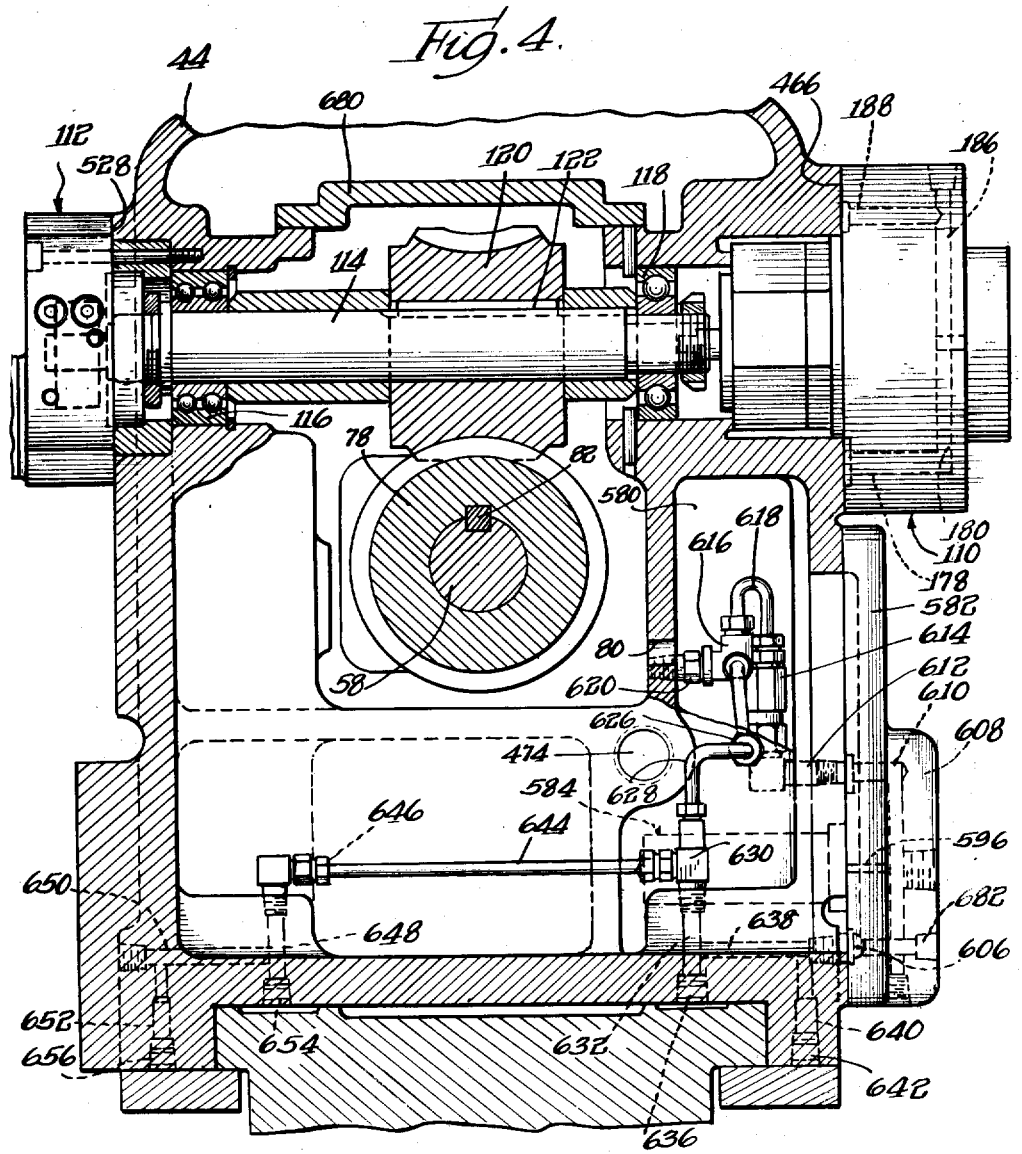
Fig. 4 is an enlarged fragmentary cross sectional view taken along line 4—4 in Fig. 3.
Figure 5:
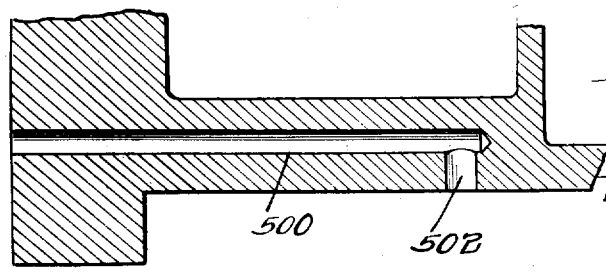
Fig. 5 is an enlarged fragmentary cross sectional view taken along line 5—5 in Fig. 10.
Figure 6:
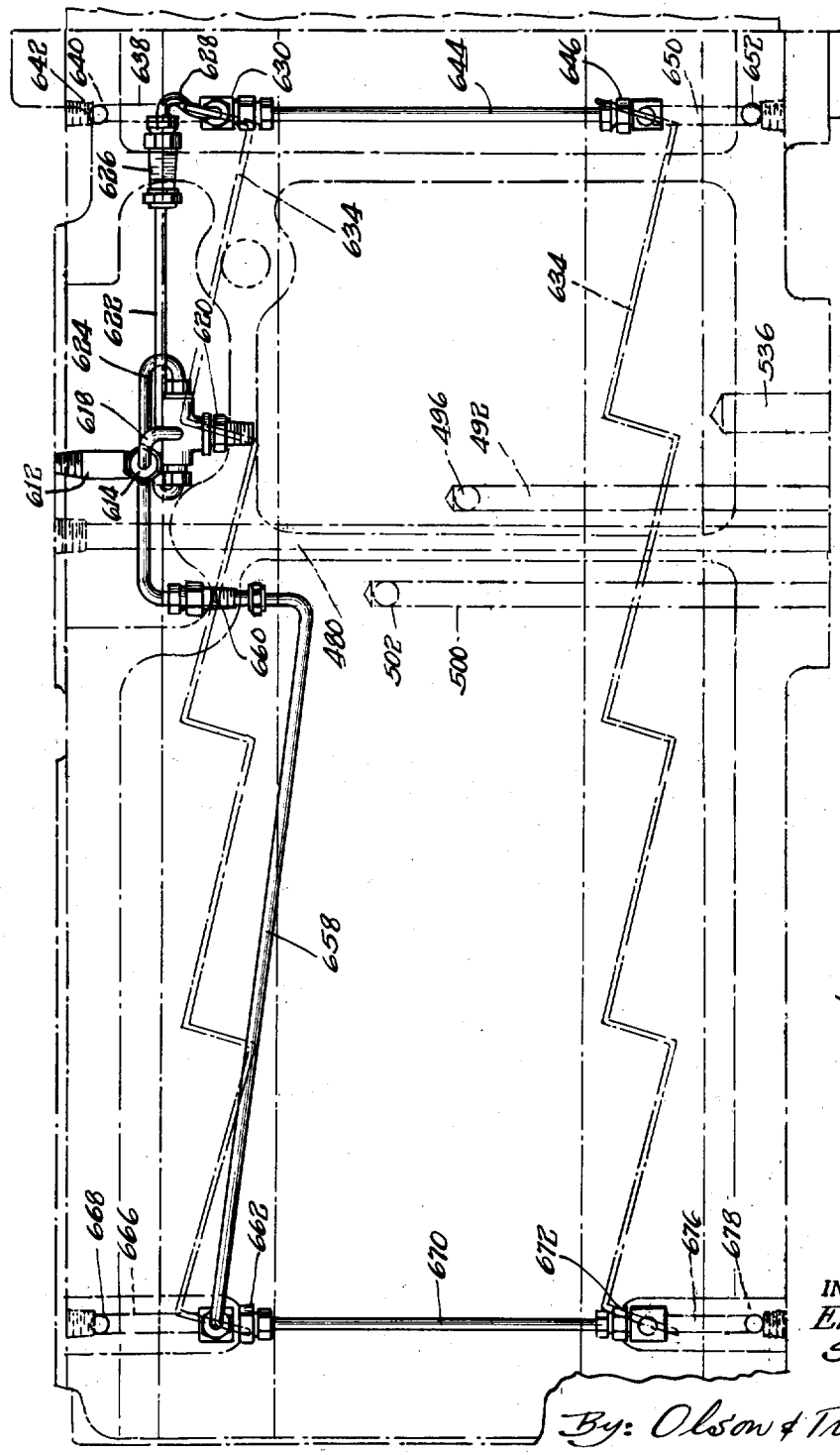
Fig. 6 is a plan view showing the conduits and associated elements of the lubricating system in solid lines and showing the head casting of the apparatus in broken lines.

Referring now more specifically to the drawings wherein like parts are designated by the same numerals throughout the various figures, the apparatus shown for the purpose of illustrating the present invention includes one or more self-contained machine tool units 40 as shown best in Figs. 1, 2 and 8.

The sliding head unit conforms to the hydraulic standards for industrial equipment established by the joint industry conference, and will replace sliding head units on programs through machines such as those shown in the following publications:

Automotive Industries, July 27, 1935, pages 110–112.
Machinery, September 1935, page 15.
American Machinist, September 20, 1939, pages 774–775.
Production, January 1954, page 233.
Automotive Industries, February 1, 1954, page 68.
Automotive Industries, March 1, 1954, page 30.
Machinery, March 1954, page 159.

In order to promote a more ready understanding of the apparatus, the various features will be described as follows: Mechanical and supporting structures; Traverse and feed pumps; Control valve structure; Hydraulic and lubricating fluid systems; Control means and electric circuit; and Statement of operation.

*Mechanical and supporting structures*

As shown best in Figs. 1 and 2, the self-contained unit 40 of this invention is adapted to be slidably mounted on a base structure 42 and to this end the unit 40 includes a head casting 44 that is provided with guideways 46 which cooperate with guideways 48 on the base structure. A suitable spindle head 50 is mounted on the face of the head casting by means of screws or the like, not shown, and an electric motor 52 is mounted on the head casting for driving the spindles through pulleys 52 and 54, a plurality of V-belts 56 and a drive shaft 58. As shown best in Fig. 3 the pulley 54 is mounted on one end of the drive shaft 58 and a gear 60 is fixed on the opposite end of the drive shaft which gear meshes with one or more pickoff gears 62 mounted on spindle drive shafts 64.

As shown best in Fig. 3 the drive shaft 58 extends through the head casting and is supported adjacent opposite ends by suitable anti-friction bearing means 66 and 68. The bearing 68 is preferably mounted within a housing 70 which is removably secured to the head casing by a plurality of screws 72. Thus, the bearing 68 can easily be removed and replaced when worn or replaced by a bearing of different size if desired.

The head casting or frame 44 is provided with an oil reservoir or chamber 74 and a gear chamber 76. The drive shaft 58 extends through the gear chamber and has mounted thereon a gear 78 which serves a purpose set forth fully hereinbelow. Lubricating oil is continuously pumped into the chamber 76 and overflows through an opening 80 in the wall of the chamber. It is important to maintain the head casting or frame structure 44 as a whole at a uniform temperature and this is accomplished by circulating the oil through the reservoir 74, the gear chamber 76 and other portions of the head frame in the manner disclosed.

The gear 78 is connected to the drive shaft by means of a key 82 and is retained against axial movement by means of a shoulder 84 on the shaft and a spacing sleeve 86 which spacing sleeve engages the inner race of the bearing structure 68. The bearing structure is retained against axial movement by means of collars 88 fixed on the shaft and engaging the inner race and a shoulder on the housing 70 engaging one end of the outer race and a snap ring 90 connected to the housing and engaging the opposite end of the outer race. This structure also serves to restrain the drive shaft 58 against axial movement. In order to prevent oil from escaping along the drive shaft and out of the gear chamber a sealing member 92 is disposed within the bearing housing 70 for engaging the inner ball race in the manner shown and a similar sealing member 94 is disposed at the opposite side of the gear chamber for engagement with a collar 96 mounted on the drive shaft and fixed to the gear by means of a pin 98. Preferably an O ring 100 is disposed within a suitable groove in the collar 96 to prevent oil from leaking between the drive shaft and the collar.

In order to reciprocate the self-contained unit 40 on the base 42 a fluid motor is provided. This motor includes a hydraulic cylinder 102 secured to the head frame 44, a piston 104 disposed within the cylinder and a piston rod 106 which is fixed to the base as indicated at 108. Preferably the piston rod is adjustably secured to the base by a pair of nut members.

In order to actuate the fluid motor a rapid traverse gear pump 110 and a feed pump 112 have been provided which pumps are mounted or connected to opposite ends of a shaft 114 as shown best in Fig. 4. The shaft 114 is rotatably mounted within the head frame or casting 44 by suitable anti-friction bearing means 116 and 118. A gear 120 is fixed to the shaft 114 by means of a key 122 which gear meshes with the gear 78 for driving the shaft 114. The gears 78 and 120 are of the type commonly known as "cone gears" and as an example of such gears reference is made to the publication thereof on page 641 of the periodical American Machinist dated September 27, 1933. It should be noted that the pumps 110 and 112 are exposed to the exterior of the head frame so that they are easily accessible for repair or replacement. It should also be noted that the shaft 114 is placed well above the overflow opening 80 in the gear chamber so that the pumps 110 and 112 may be removed without requiring the gear chamber to be drained of oil in order to avoid loss of oil through the pump openings in the head frame.

*Rapid traverse and feed pumps*

Referring now more specifically to Figs. 4 and 25 through 29 it is seen that the rapid traverse gear pump 110 includes a main housing section 130 and inner end housing section 132 and an outer end housing section 134.

The housing sections are retained together by a plurality of bolts 135 in the manner shown in Fig. 28. The main body section 130 is provided with a radially extending flange having a plurality of apertures 136 therethrough for receiving bolts or screws, not shown, used to secure the pump to the head frame. The main body section is provided with a suitably formed chamber 138 in which is disposed a pair of meshing gears 140 and 142. The gear 140 is mounted on a shaft 144 and fixed to the shaft of means of a pin 146 and the gear 142 is similarly mounted on a shaft 148 and fixed thereto by means of a pin 150. The shafts 144 and 148 are supported adjacent their opposite ends by needle bearing units 152 or any other suitable anti-friction bearing means. The main body section 130 is drilled or otherwise formed to provide an inlet passageway 154 and an outlet passageway 156. The shaft 144 extends out of the body section 132 through suitable sealing means 158 and is connected to the shaft 114 by means of a flexible coupling 160. As will appear from the description given hereinbelow, the fluid that is pumped by the gears 140 and 142 is utilized for actuating the cylinder 102 to move the head frame along the base.

In order to allow fluid which may be trapped by the rotary seal means 158 to drain back into the intake passageway 154, the body section 132 is provided with a drilled passageway 162 which communicates with the intake side of the pump. A smaller passageway 164 connects the passageway 162 and the recess in the body section 132 which houses the rotary seal means. As shown best in Figs. 27 and 29 the body section 132 is also provided with passageways 166 and 168 for the purpose of relieving the pressure on any fluid trapped between meshing teeth of the gears.

The pump structure 110 is provided with a second set of meshing gears 170 and 172 for providing fluid under pressure to pre-load the feed pump which will be described below. The gear 170 is connected to the pump shaft 144 by means of a pin 174 and is located within a suitable chamber 176 formed in the body section 134. The gear 172 may be freely mounted on the shaft 148 but since the shaft 148 is driven by the primary gears 140 and 142 there will be no relative rotation between this shaft and the gear 172. As shown best in Figs. 4, 25 and 27 the body section 130 is provided with connected passageways 178, 180 and 182 which provide an oil inlet for the chamber 176. The outlet for this chamber is provided by passageways 184, 186 and 188 formed in the body section 130. Preferably, the body section 130 also includes passageways 190 and 192 for relieving the pressure on oil trapped between meshing teeth of the gears 170 and 172 and the body section 134 is provided with a passageway 194 for draining oil escaping past the end of the shaft 144 back into the inlet side of the chamber 176.

In order to prevent injury to the pump structure 110 and to the fluid system, a relief valve is provided for controlling the pressure of the fluid pumped by the gears 170 and 172. More specifically, the body section 134 is provided with passageways 196 and 198 connecting the inlet and discharge sides of the chamber 176. The passageway 198 is provided with a valve seat 200 which is normally closed by a valve 202 resiliently pressed against the seat by means of a spring 204. The spring acts against a member 206 which is threaded into an enlarged bore 208 so that by adjusting the member 206 the relief valve may be set to open at any desired pressure. The end of the bore 208 is preferably sealed by means of a threaded plug 210 having a head 212 overlying a sealing washer 214. A pressure relief valve should also be provided for the fluid pumped by the gears 140 and 142 and this valve which is not shown may be identical to the relief valve just described and it may be either built into the pump body section or into the headframe or casting 44.

In some instances it may be permissible to use a rapid traverse pump which does not have incorporated therein a charging or preloading pump section, and in such instances, a novel pump structure 137 shown in Figs. 37 through 41 may be used in the manner illustrated in Fig. 36. The pump structure 137 includes body members 139, 141 and 143 which are secured together by a plurality of screws 145. The body member 141 is formed with an inlet passageway 147 which extends axially entirely therethrough and intersects a radially extending passage way 149 therein. The passageway 149 communicates with a gear chamber 151 which chamber also communicates with outlet passageways 153 and 155. In accordance with the present invention the capacity of the pump 141 is materially increased in a simple and economical manner by providing the body member 143 with a gear chamber 157, which chamber communicates with the gear chamber 151 and also communicates with the inlet passageway 147 through passageways 159 and 161.

A pair of shafts 163 and 165 are rotatably mounted within the body members by means of a plurality of anti-friction or needle bearing units 167. The shaft 163 extends axially from the body member 139 through a suitable rotary seal unit 169 for connection with the drive shaft 114 through a flexible coupling 171. It is understood that the pump structure 137 is adapted to be mounted on the head frame in place of the above described pump 110 with the inlet and outlet passageways 147 and 155, respectively, registering with suitable passageways formed in the head frame. A gear element 173 is mounted on the shaft 163 and fixed thereto by means of a pin 175, which gear element meshes with a gear element 177 mounted on a shaft 165. Similar gear elements 179 and 181 are mounted on the shafts 163 and 165, respectively, and are disposed within the chamber 157. In order to facilitate assembly of the gears and body members of the pump structure 137, it should be noted that the gear 179 is fixed against rotation relative to the shaft 163 by means of a pin 183, which pin 183 extends into slots 185 in the gear. Thus, the gear 173 and the pin 175 serve to position the shaft 163 relative to the body members while the gear 179 is axially moveable to prevent binding between the gears and the body members. The gear 181, like the gear 173, is fixed against both axial and rotating movement relative to the shaft 165 by means of a pin 187. However, the gear 177 is freely disposed on the shaft 165 so as to facilitate assembly. Since the shaft 165 is driven through the gears 179 and 181 and since the gear 177 is driven by the gear 173, there will be practically no relative rotation between the gear 177 and the shaft 165, but there will be sufficient play between these parts to insure proper operation of the pump structure.

In order to prevent injury to the pump structure 137, the body member 141 is provided with a small axially extending passageway 189 which is in alignment with the meshing teeth of the two sets of gears and which also communicates with the discharge side of the gear chambers through a passageway 191. Thus, the passageways 189 and 191 serve to relieve the pressure of any fluid trapped between the meshing teeth of the gears. In addition, the pump structure is provided with pressure relief valve means. As shown best in Fig. 39, this means includes passageways 193, 195 and 197 connecting the inlet and discharge sides of the gear chamber 157. The passageway 195 is provided with a valve seat 199 against which a valve member 201 is resiliently biased by means of a spring 203. The fluid pressure at which the valve would open may conveniently be adjusted by turning a threaded plug 205 which backs up the spring 203. In order to prevent fluid from leaking from the pump structure past the ends of the shafts, the body members 143 and 139 are provided with small drain passageways 207 and 209 as shown best in Figs.

40 and 41 for permitting fluid to drain from adjacent the ends of the shafts 163 and 165, respectively, back to the inlet side of the gear chambers. The body member 139 is provided with a similar drain passageway 211 communicating with the chamber housing the rotary seal.

The variable output feed pump 112 is shown best in Figs. 4 and 30 through 34 and includes a one piece body member 220. The body member is provided with a pair of opposed cylindrical pumping chambers 222 and 224 in which are slidably disposed pistons 226 and 228. The outer ends of the pumping chambers are closed by plugs 230 and sealing washers 232 and the pistons extend out of the inner ends of the chambers for engagement with actuating means disposed within a recess 233. This actuating means includes a bell crank 234 pivotally mounted to the body member at 236 and having an end portion 238 for engagement with the piston 226. A similar bell crank 240 is pivotally mounted to the body member at 242 and is provided with an end portion 244 for engaging the piston 228. As shown best in Figs. 4 and 34 the drive shaft 114 is provided with an eccentric pin portion 246 which extends into the body member 220 between the bell cranks for actuating the bell cranks and preferably an anti-friction bearing unit 248 is mounted on the eccentric pin so that the outer race of the bearing unit engages the end portions 238 and 244 of the bell cranks.

The fluid inlet channel for the pump 112 is provided in part by passageways 250 and 252 which are drilled or otherwise formed in the body member. The outer end of the passageway 252 is closed by a plug 254 and the inner end communicates with a passageway 256 which opens at its opposite ends into valve chambers 258 and 260 formed at opposite sides of the body member. Check valve means is located in each of these chambers, which means includes a valve seat member 262, a ball valve 264 and a spring 266 backed up by a plug 268 for resiliently urging the ball against the valve seat. A passageway 270 is provided between the outer end of the pumping chamber 222 and the outer portion of the valve chamber 258 and a similarly located passageway 272 is provided between the pumping chamber 224 and the valve chamber 260. With this arrangement it is seen that fluid under pressure from the pumping gears 170 and 172 of the pump structure 110 may enter the pump 112 through the inlet passageways, force the check valve 264 open and thence pass into the pumping chambers. Since the pistons 226 and 228 are actuated alternately by the eccentric pin and bearing means, it is understood that the charging fluid from the pump structure 110 will enter into the pumping chambers alternately. Thus, with the parts in the position shown in Fig. 34, the charging or pre-loading fluid will pass through the check valve in the chamber 258 and thence into the pumping chamber 222 during the time that the piston 228 is moving outwardly during its pumping stroke. The charging fluid entering the chamber 222 not only fills the chamber for the next pumping stroke of the piston 226 but also serves to force the piston towards its innermost position. The charging fluid entering the feed pump is under considerable pressure created by the pre-loading gear pump section and this materially increases the efficiency and accuracy of the feed pump. This results from the fact that the fluid entering the feed pump has been slightly compressed so that it cannot be further compressed an appreciable amount by the feed pump. While, of course, the amount which non-loaded or pressurized fluid might be compressed by the feed pump is small and in the nature of about .05%, such compression is often sufficient to introduce an undesirable error in the work performed by the machine tool unit. In addition, the pre-loading of the charging fluid substantially eliminates any possibility of fluid leaking back through the check valves during pumping strokes of the pistons.

The fluid pumped from the chamber 222 passes back through the passageway 270 into the chamber 258 and thence into a passageway 276 which is shown best in Fig. 30. The passageway 276 opens into a check valve chamber 278 in which is located a check valve structure 280 which may be substantially identical to the check valve described above and, therefore, need not be set forth in detail. Finally, the fluid passes from the chamber 278 through an outlet passageway 282 which is drilled or otherwise formed in the body member. The fluid from the pumping chamber 224 similarly passes back through the passageway 272 and the check valve chamber 260 and thence into a passageway 284. The passageway 284 connects with another check valve chamber 286 in which is disposed a suitable check valve structure, not shown, which is identical to the valve structure 280. A transversely extending passageway 288 connects the chambers 278 and 286 so that the fluid from the pumping chamber 224 is also ultimately discharged through the passageway 282. As will be understood, the check valve 280 prevents fluid being discharged from the pumping chamber 224 from passing upwardly toward the pumping chamber 222 while the chamber 222 is being charged with fluid from the pump structure 110, and the check valve in the chamber 286 acts in a similar manner when fluid is being discharged from the pumping chamber 222.

From the above description, it is apparent that the pistons 226 and 228 are alternately forced outwardly by the eccentric pin 246 and its associated elements to pump the fluid from their respective chambers and they are alternately forced inwardly during charging of their respective chambers by the pressure of the precharging fluid. In order to vary the rate of discharge of the feed pump 112 means is provided for adjustably limiting the inward movement of the pistons, or in other words, means is provided for changing the length of the stroke of the pistons. This means includes a block 290 which is slidably mounted in a suitable slot 292 formed in the body member. As shown best in Figs. 31 and 32, the block 290 is disposed for engagement by the ends of the bell cranks 234 and 240 whereby the block serves to limit the pivotal movement of the bell cranks during the charging stroke of the pistons. Thus, by adjusting the position of the block 290 the stroke of the pistons may be changed as desired. In order to adjustably support the block 290 a shaft 294 is rotatably mounted in a suitable bore in the body member which shaft is provided with an eccentric pin 296 disposed within a suitable recess formed in the body member. The eccentric pin 296 extends into a slot 300 formed in the block 290 so that upon rotation of the shaft 294 the eccentric pin serves to raise or lower the block. A threaded stud 302 is inserted into a bore in the outer end of the shaft 294 to provide convenient means for adjusting the shaft and the shaft may be locked in any desired adjusted position by a clamping nut 304. In order to provide means for indicating the position to which the shaft 294 is adjusted, a dial 306 is mounted thereon for cooperation with a pointer 308 formed on the body member. The dial is retained against rotation relative to the shaft by means of a pin 310. Preferably, the outer end of the shaft 294 is covered by a cap 312 which is secured to the body member by a screw 314 in order to prevent inadvertent or unauthorized adjustment of the shaft.

The body member 220 is provided with passageways 316 and 318 in order to drain any fluid which accumulates within the recess 233. In addition, an O ring 320 is provided within a suitable groove in the shaft 294 to prevent the fluid from escaping along the shaft.

Control valve structure

In Figs. 16 through 24 there is shown a control valve 330 which embodies certain principles of the present invention. As will become apparent the control valve is constructed so that a complete cycle of movement of the head frame or casting 44 includes a rapid forward traverse motion, a slower forward feed motion, and a rapid return motion. In addition, the valve is provided with a stop or neutral position between the rapid advance and rapid return positions.

The valve 330 includes a body 332 which is provided with transversely extending passageways 334, 336 and 338, respectively, receiving a main valve structure 340, a feed valve stem 342 and a pair of pilot valve stems 344 and 346. A pair of end plates 348 and 350 are secured to the opposite ends of the body member. The valve body 332 is provided with an inlet passageway 352 which is adapted to be connected to the main outlet 156 of the pump structure 110 by conduit or passageway means 354 described in detail below and schematically shown in Figs. 7 and 21 through 24. Another passageway 356 in the valve body is adapted to be connected to the inlet side of the feed pump 112 through suitable conduit means 358 and the precharging pump section of the pump structure 110 which for the purpose of better illustration, has been schematically shown as separate from the remainder of the pump structure 110 in Figs. 7 and 21 through 24 and is generally designated by the numeral 360. The passageway 356, as shown in Fig. 19, is connected to the feed valve stem passageway by passageways 357 and 359. The valve body member 332 is further provided with a passageway 362 which is adapted to be connected to the forward end of the hydraulic cylinder 102 through suitable conduit means 364. It should also be noted that the discharge side of the feed pump 112 is connected to the conduit means 364. A passageway 366 is formed in the valve body member which passageway is adapted to be connected to the rear end of the cylinder 102 through suitable conduit means 368. A relatively large drain passageway 370 is also provided in the valve body member which drain passageway is connected with the main reservoir in the manner more fully described below.

Figure 21:
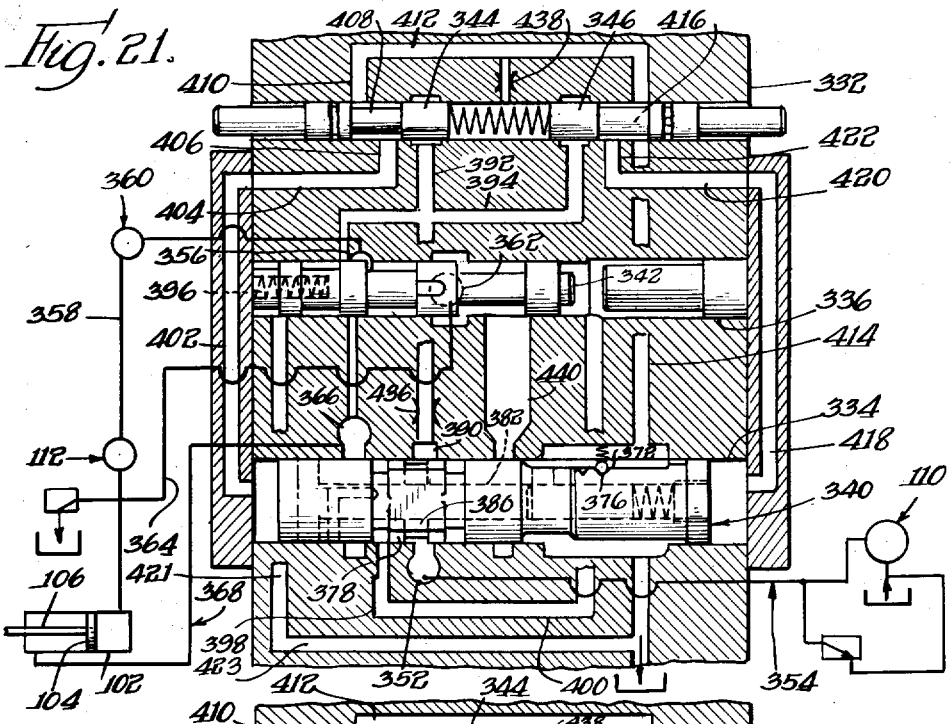
Figs. 21-24 are semi-diagrammatic cross sectional views of the novel control valve, respectively, showing the valve elements in neutral, rapid advance, feed, and rapid return positions.

The various valve stems of the control valve structure are shown in the neutral position in Figs. 19 and 21. In this position the main valve stem 340 is generally centrally located within the passageway or bore 334 and it is releasably retained in this position by means of a spring pressed ball detent 372 shown in Fig. 20. The detent is located within an enlarged chamber 374 and is engageable with a groove 376 formed in the main valve stem for retaining the main valve stems in the neutral position. The flow of fluid from the rapid traverse pump 110 is through the passageway 352 and into the central portion of the main valve stem passageway 334 and around a central spool portion 378 of the main valve stem. Then the fluid passes through a transverse passageway 380 formed in the spool portion of the main valve stem and into a centrally located axially extending passageway 382 within the main valve stem. A spring operated orifice or circulating valve 384 is disposed within the passageway 382 and is operable to permit fluid to pass out of the passageway 382 through a passageway 386 and into the detent chamber 374 from where the fluid passes through the drain passageway 370 back to the reservoir. The pressure relief or circulating valve 384 may be of any suitable construction and includes adjustable spring means 388 so that the pressure at which the relief valve opens may be varied as desired. Preferably, the relief valve should be set to open when the pressure is between 35 and 55 pounds per square inch.

While the valve stems are in the neutral position, fluid under pressure from the rapid traverse pump will be maintained in a passageway 390 that connects with the central portion of the main valve stem passageway and also connects with passageways 392 and 394 which are blocked by the pilot valves 344 and 346, respectively. At the same time, fluid under pressure is maintained in the right hand end of the feed valve stem passageway 336 to maintain the feed valve stem in its neutral position, which valve stem is resiliently biased toward the right by means of a spring 396. The fluid under pressure is introduced into the right hand end of the valve stem passageway 336 through the passageway 398 which connects the central portion of the valve stem passageway 334 with a suitably drilled passageway 400.

While the various valve stems are in the neutral position, the opposite ends of the main valve stem passageway 334 and the left end of the feed valve passageway 336 are connected with the detent chamber 374 and thus the drain passageway 370. More specifically, the left hand end of the main valve stem passageway 334 communicates with passageways 402, 404 and 406 which connect with the pilot valve passageway 338 in alignment with a reduced diameter portion 408 of the pilot valve stem 344. From this portion of the pilot valve passageway, the fluid passes into a passageway 410 and thence into a passageway 412. The passageway 412 is connected with the detent chamber 374 by means of a passageway 414. In the simplified diagrammatic disclosures of Figs. 21 through 24, the passageway 414 is shown as intersecting the pilot valve passageway in alignment with a reduced diameter portion 416 of the pilot valve stem 346 so that the passageway 414 also serves as a drain for the right hand end of the main valve stem passageway which is connected with the pilot valve stem passageway through passageways 418, 420 and 422. However, in the structure disclosed in Fig. 19 a separate drain line 414a is provided between the detent chamber 374 and the pilot valve stem passageway for draining the right hand end of the main valve stem passageway. The left end of the feed valve stem passageway is connected to the drain by passageways 421 and 423.

In order to operate the pilot valves which are normally retained in the neutral position by means of a compression spring 424 disposed therebetween, solenoids 426 and 428 are mounted on opposite ends of the control valve structure. A lever 430 is pivotally mounted on the end plate 348 and is operable by the plunger 432 when the solenoid 426 is energized to shift the pilot valve stem 344. A similar lever 434 is pivotally mounted on the end plate 350 and is operable by the plunger 436 for actuating the pilot valve stem 346.

Figure 22:
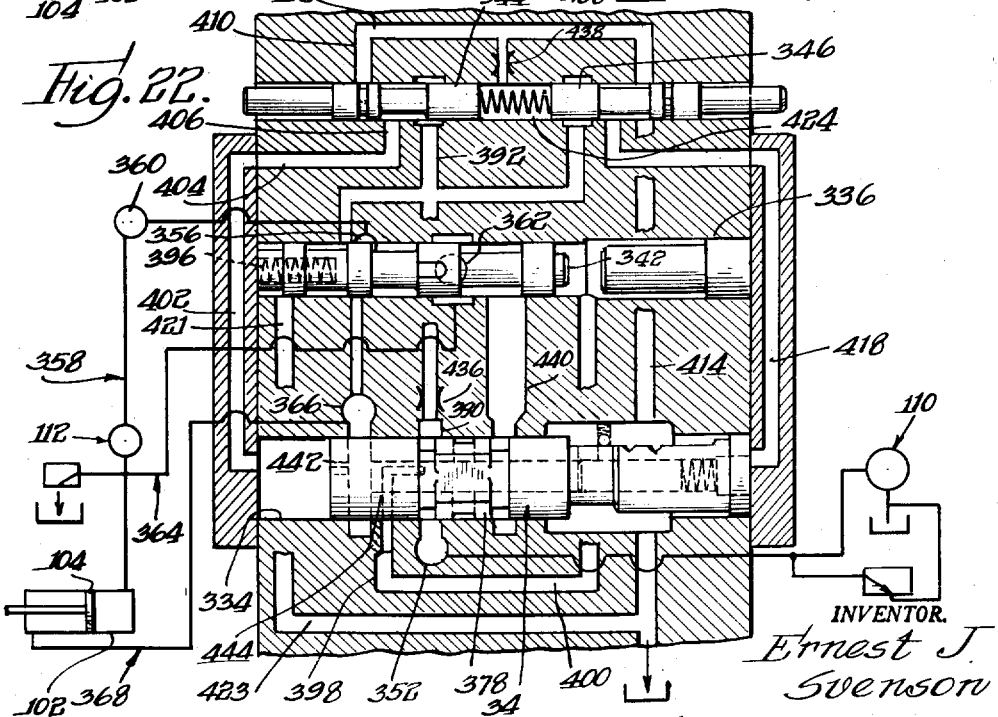

The cycle of the sliding head frame work casting is initiated by energizing the solenoid 426 so that the pilot valve stem 344 is shifted to the position shown in Fig. 22. With the pilot valve stem 344 in this position, the passageway 392 is unblocked while the drain passageway 410 is closed. Thus, the fluid under pressure is permitted to flow through the passageway 392 and a restricted orifice member 436 disposed therein which serves to reduce the flow rate and prevent too rapid shifting of the main valve stem as explained below. During the time the pilot valve stem is shifted, fluid between the pilot valves is forced through a restricted orifice member 438 into the drain line 412, which restricted orifice member serves to meter the fluid and prevent fluid from the right end of the main valve stem passageway from forcing the pilot valve stem 344 back out. The fluid passing from the passageway 392 flows through the passageways 402, 404 and 406 and into the left end of the main valve stem passageway 334 to shift the main valve stem toward the right without undue force. The solenoid 426 may then be deenergized allowing the spring 424 to return the pilot valve stem 334 to its neutral position without causing any change in the position of the main valve stem.

With the main valve stem in the position shown in Fig. 22, the fluid under pressure from the rapid traverse pump passes across suitable flats provided in the spool portion 378 of the main valve stem and through a passageway 440 to the feed valve stem passageway 336. Then the fluid passes out through the passageway 362 into the conduit means 364 and to the hydraulic cylinder 102 for causing rapid advance or traverse of the head frame. Fluid from the rear end of the hydraulic cylinder 102 flows through the conduit means 368 and into the passageway 366, a transverse passageway 442 formed in the main valve stem, the centrally located passageway 382 in the main valve stem and thence out through the relief valve 384. It should be noted that with the main valve stem in the rapid advance position, fluid under pressure is still available in the right end of the feed valve stem passageway 336 for holding the feed valve stem against the compression spring 396 since the main valve stem is provided with an L-shaped passageway 444 located to communicate with the passageway 398. The feed valve stem is provided with flats 462 to permit charging of the feed pump during rapid approach.

Figure 23:
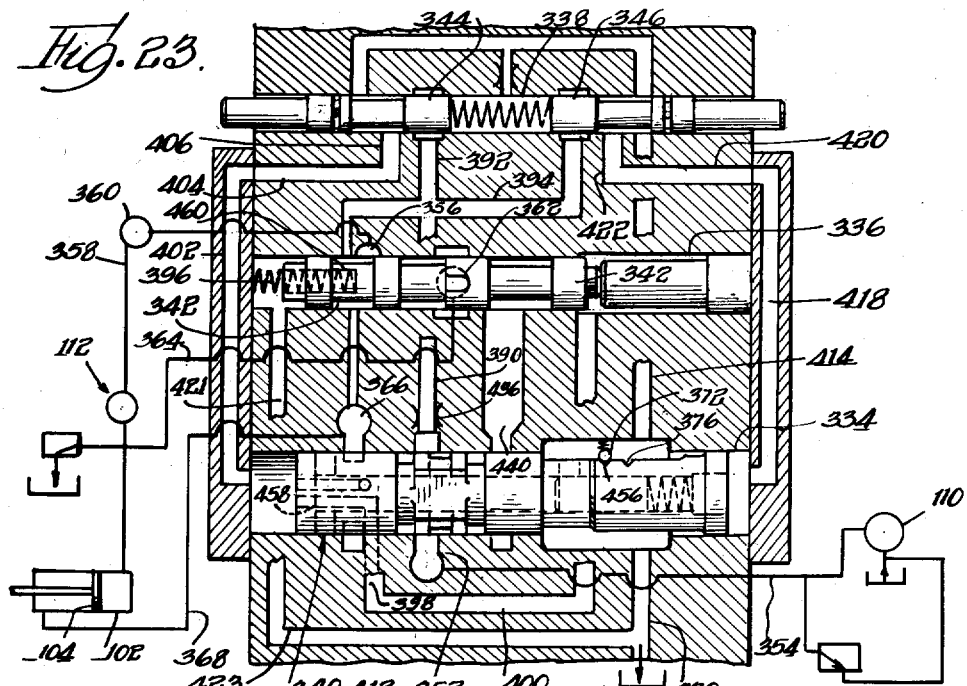

At the end of the rapid advance movement of the sliding head frame, the main valve stem 340 is shifted to the position shown in Fig. 23. In order to accomplish this shifting of the main control valve stem, a shaft 450 is journalled in the valve body as shown in Fig. 19, which shaft is provided with a control finger 452 extending into a suitable slot in the main valve stem. A cam member 454 is secured to the shaft 450 for engagement with a fixed control dog which will be described below. The main valve stem is held in this position by the ball detent 372 which enters a groove 456. In this position the main control valve stem blocks the passageway 440 so that a major portion of the fluid being circulated by the rapid traverse pump is returned to the reservoir through the spring operated orifice or circulating valve 384 and another portion of the fluid passes through the passage 390 to the outlet 356 from where it is directed to the charging or pre-loading pump 360 and the feed pump 112 and finally into the hydraulic cylinder 102. It should be noted that when the main control valve stem is in the position shown in Fig. 23, the left hand end of the main valve stem passageway 334 is connected with the drain and the right hand end of the feed valve stem passageway 336 is also connected with the drain through passageways 398 and 400 and an L-shaped passageway 458 formed in the main valve stem and connecting the passageway 398 and the left hand end of the main valve stem passageway. Thus, the pressure in the right hand end of the feed valve stem passageway is relieved so that the spring 396 shifts tthe feed valve stem toward the right to the position shown in Fig. 23. With the feed valve stem in this position, fluid under pressure from the rapid traverse pump passes through the passageways 390 and 394 and to the feed valve stem passageway 336 at a position in alignment with a reduced diameter or spool portion 460 of the feed valve stem. The pressure of the fluid in this portion of the feed valve stem passageway is determined by the setting of the circulating valve or spring operated orifice 384 and it should be noted that the return line 368 from the hydraulic cylinder is also connected with this portion of the feed valve stem passageway so that the cylinder 102 is operated against a back pressure determined by the setting of the circulating valve 384. The fluid returning through the line 368 is recirculated through the feed valve stem passageway and to the feed pump so that a substantially closed feeding fluid circuit of the general type disclosed in my Patent No. 2,388,716 dated November 13, 1945, is provided. The above mentioned restricted orifice or passage member 436 does permit sufficient fluid to pass into the feeding fluid circuit to compensate for the fact that the volume of fluid in the end of the cylinder in which the piston rod is located is insufficient to fill the opposite end of the cylinder. With this arrangement positive and accurate control of the relative movement between the piston and the hydraulic cylinder is obtained during feeding movement of the main head frame.

Figure 24:
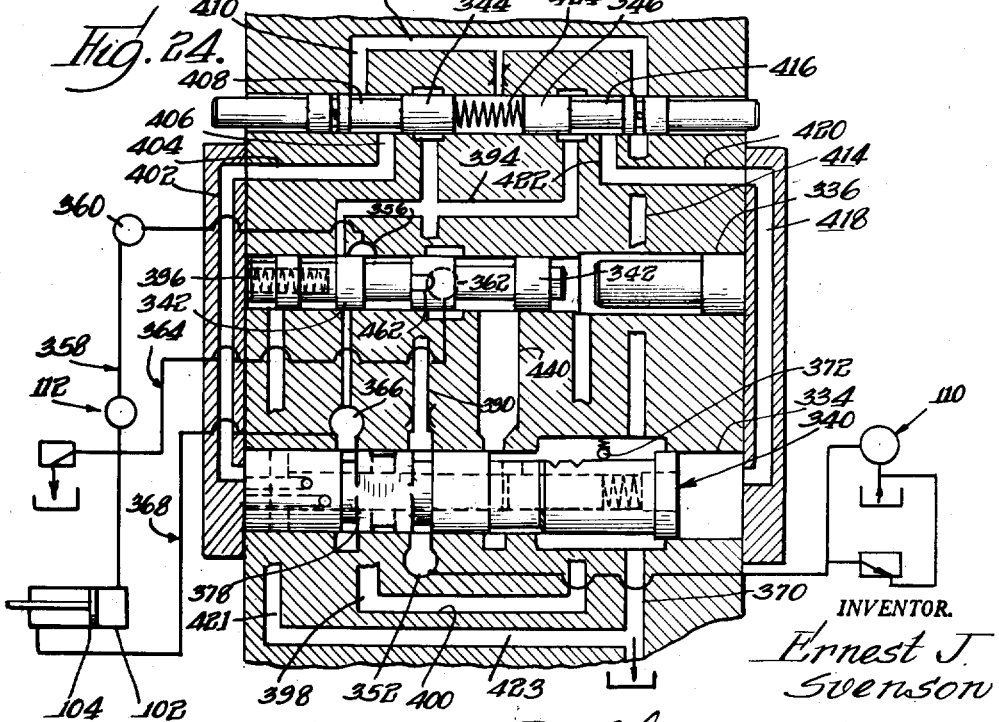

At the end of the feeding movement of the sliding head frame, the solenoid 428 is energized in the manner described below so that the pilot valve 346 is shifted to the position shown in Fig. 24. With the pilot valve 346 in this position, fluid flows through the passageways 418, 420 and 422 and into the right hand end of the main control valve stem passageway 334 to shift the main control valve stem to the position shown in Fig. 24. At any time after the main control valve stem has been shifted to the left the pilot valve 346 may be permitted to return to its normal position by deenergizing the solenoid 428 without causing a change in the position of the main control valve. With the main control valve stem in the position shown in Fig. 24, it is seen that fluid under pressure from the rapid traverse pump will enter the passageway 352 and cross suitable flats formed in the spool portion 378 of the main valve stem and then pass through the passageway 366 and to the rear end of the hydraulic cylinder 102 through the line 368. At the same time fluid under pressure is restored to the right hand end of the feed valve stem passageway 336 so that the feed valve stem is shifted toward the left against the action of the spring 396. With the main and feed valve stems in the positions shown in Fig. 24, the forward end of the hydraulic cylinder 102 is connected with the drain through the lines 358 and 364 which return the fluid to the feed valve stem passageway 336. The feed valve stem passageway is in turn connected to a portion of the main valve stem passageway which is open to the drain by the passageway 440. At the end of the return movement of the sliding main head frame, the main control valve stem is again shifted to the neutral position by means of a cam 464 which is mounted on the shaft 450 and which engages a fixed control dog described below.

Hydraulic and lubricating fluid systems

In accordance with the present invention the hydraulic and lubricating fluid systems of the apparatus has been simplified and has been formed with a minimum number of separate conduits and couplings so that the apparatus may be more economically assembled and maintained and so that any possibility of fluid leakage is reduced to a minimum. More specifically, as will appear from the description given below, the majority of the fluid conduits of the hydraulic and lubricating system are formed integrally with the sliding head frame structure and other separate conduits are located within the head frame structure. Thus, as shown best in Figs. 4 and 13, the back side of the sliding head frame structure is provided with a machined surface 466 against which the pump structure 110 is applied and tightly secured by means of screws extending through the apertures 136 in the pump body and threaded into complementary apertures 468 in the head frame. The inlet 154 of the pump structure 110 registers with a passageway 470 drilled or otherwise suitably formed in the head frame, which passageway 470 is interconnected with the fluid reservoir by means including passageways 472 and 474. The outlet 156 of the pump structure 110 registers with a passageway 476 formed in the head frame which passageway connects with a vertical passageway 478. The passageway 478 communicates with a passageway 480 which extends entirely across the head frame and registers with the inlet passageway 352 of the control valve body which is mounted against a machined surface 482 on the front side of the head frame structure. The control valve is tightly secured against the surface 482 by means of screws which are passed through apertures 486 in the head frame. As shown best in Figs. 10 and 12, the head frame is formed with a passageway 488 which is located to register with the passageway 362 of the control valve structure. The passageway 488 communicates with a vertically extending passageway 490 which intersects a transversely extending passageway 492 having its outer end closed by plug 494 and having its inner end connected with a downwardly extending passageway 496. The passageway 496 is connected to the forward end of the hydraulic cylinder 102 through a suitable passage 498 formed in the body of the hydraulic cylinder, which body is secured against the bottom of the head frame structure by any suitable means, not shown. As shown best in Figs. 5, 6, 7 and 10, the head frame is provided with a transversely extending passage 500 which registers with the passageway 366 in the control valve body and which also communicates with a downwardly extending passage 502. The passage 502 is connected with the rear end of the hydraulic cylinder 102 through a suitable passage 504 formed in the cylinder body.

The head frame structure is provided with a passageway 506 which opens at the surface 482 and communicates with the passageway 356 of the control valve body. The fluid flowing into the passageway 506 is conducted by suitable passageway or conduit means, not shown, to a passageway 508 opening at the opposite side of the head frame structure and registering with the inlet 178 of the charging or pre-loading pump section 360 of the pump structure 110. Fluid discharged by the charging pump section emerges from the outlet passageway 188 and enters a passageway 510 formed in the head frame structure. The fluid is directed by the passageway 510 into suitable conduit or passageway conduit or passageway means, not shown, and into a passageway 512 from where it emerges into a filter chamber 514 as shown best in Figs. 10 and 11. As shown in Fig. 36, the outlet passageway 356 may be connected directly to the feed pump in installations wherein the pre-loading pump is not used and this is accomplished by modifying the head frame structure to provide a passageway, not shown, connecting the passageway 506 and the filter chamber 514. The fluid passes from the chamber through a suitable filter element 516 disposed therein and into a passageway 518 formed in a plate 520 covering the chamber. The opposite end of the passageway 518 connects with a passageway 522 formed in the head frame. The passageway 522 communicates with a vertically extending passageway 524 which intersects, adjacent its upper end, a passageway 526 that registers with the inlet passageway 250 of the piston feed pump structure 112. As shown best in Figs. 4 and 10, the head frame is provided with a machined surface 528 against which the feed pump is mounted and retained by a plurality of screws passing through apertures 532 in the head frame. The outlet 282 of the feed pump registers with a passageway 534 formed in the head frame. As shown best in Figs. 10 and 12, the above described passageway 490 extends upwardly and intersects the passageway 534 so that the outlet of the feed pump is connected to the forward end of the cylinder 102 through the passageways 492, 496 and 498.

The sliding head frame is provided with still another passageway 536 shown best in Fig. 10, which passageway connects the drain passageway 370 of the control valve with the reservoir. In addition, the head frame is provided with a passageway 538 which communicates with the drain opening 318 of the feed pump and also intersects a passageway 540. The passageway 540 communicates with a vertically extending passageway 542 which directs the fluid back to the reservoir.

The passageway 490 through which fluid discharged from the feed pump passes intersects a chamber 546 formed in the head frame, which chamber houses a feed pump relief valve structure generally designated with numeral 548, see Fig. 11. The relief valve structure 548 includes a seat member 550 having a reduced diameter portion 552 and an end slot 554 so that fluid may pass from the passageway 490 around the inner end of the seat member. The seat member is provided with a central bore in which is slidably disposed a stem 556 of a valve 558. A hollow body member 560 is mounted partially within the valve chamber, which body member is provided with an integral apertured lug, not shown, for receiving securing screws adapted to be threaded into apertures 561 in the head frame. A compression spring 562 is mounted within the bore 564 of the body member for yieldably retaining the valve 558 against the valve seat. The pressure at which the valve will open may be easily adjusted by turning the screw member 566 against which the spring abuts.

The relief valve stem 556 is provided with a centrally located bore 568 which opens into an angularly disposed groove 570. It should be noted that the groove is formed so that the side walls thereof extend at an acute angle to the longitudinal axis of the valve stem. With this structure, the valve must be moved so that the entire periphery of the groove 570 emerges from the bore in the valve seat member before the valve will be completely open, whereby the valve serves to relieve the pressure progressively as required thereby avoiding sudden changes in the pressure of the fluid operating to feed the head frame. The fluid which flows around the valve 558 passes from the bore of the body member 560 into a transverse opening 572 which communicates with a vertical passageway 574 formed in the headframe. The passageway 574, in turn, is connected to the drain passageway 536.

In order to insure proper lubrication of the ways and gears of the sliding head unit, the apparatus is provided with a lubricating system which pumps oil to the ways and the gear chamber during each stroke of the sliding head unit. Thus, at the back side of the headframe there is provided a lubricating pump oil reservoir 580 which is closed by a cover plate 582. As shown best in Figs. 14 and 15, a lubricating pump generally designated by the numeral 584 is mounted within a bore 586 formed in the head frame adjacent the reservoir 580. The lubricating pump includes a body member 588 having a central bore 590 in which is slidably mounted a piston 592. It should be noted that an inner portion of the bore 586 intersects the fluid passageway 478 which passageway is filled with liquid discharged from the rapid traverse section of the pump structure 110. As will be understood, the fluid pressure in the passageway 478 periodically increases during each stroke of the sliding head unit and this increase in pressure serves to advance the lubricating pump piston 592 against the pressure of a spring 594. Upon each advance of the piston 592 lubricating oil which has filled the forward portion of the bore 590 in front of the piston is discharged from the bore into a passageway 596 formed in the cover plate. In order to introduce lubricating oil into the pump, the body 588 is provided with an annular recess 598 which is connected to the central bore 590 by a transverse passage 600. The head frame is provided with a vertical passageway 602 which intersects the bore 586 in alignment with the recess 598 and also intersects a horizontal passageway 605. The passageway 604 opens into a groove 606 formed in the cover plate 582 as shown best in Figs. 4 and 14, which groove communicates with the reservoir 580.

The lubricating pump outlet passageway 596 formed in the cover plate communicates with a vertical passageway 608 which, in turn, intersects a horizontal passageway 610. The lubricating oil then flows through a suitable coupling member 612 and a check valve 614 of any known construction. The check valve 614 is connected to a coupling member 616 by a conduit 618 which coupling member is, in turn, connected to the gear chamber through a suitable check valve and metering unit 620 and to conduits 622 and 624. The conduit 622 is connected to a coupling 626 passing through a web of the head frame as shown best in Fig. 6 which coupling is connected by a conduit 628 to a suitable coupling device 630. The device 630 communicates with a passageway 632 formed in the head frame which passageway communicates with an oil groove 634 in the bottom of the head frame through a metering and check valve device 636 of known construction. The passageway 632 also communicates with a laterally extending passageway 638 and a vertically extending passageway 640 which opens on another slide surface of the head frame through a metering device 642. The device 630 is also connected to a transversely extending conduit 644 having its opposite end connected to a coupling device 646. The device 646, in turn, communicates with passageways 648, 650 and 652 which discharge lubricating oil through the metering devices 654 and 656 which are positioned in the same manner as the metering devices 636 and 642 described above.

The conduit 624 is connected to a rearwardly extending conduit 658 by means of a coupling device 660 which extends through a web of the head frame. The conduit 658 is connected to a coupling device 662 which communicates with the slide surfaces of the head frame through a passageway similar to passageway 632 and passageways 666 and 668 and suitable metering devices in substantially the same manner as the device 630 described above. In addition, the device 662 is connected to a conduit 670 which extends across the head frame and is connected to a device 672 that is substantially identical to the device 646 described above. The coupling device 672 communicates with the same slide surfaces as the device 646 through a passageway similar to passageway 648 and passageways 676 and 678 and suitable metering devices.

The lubricating system is filled with oil by pouring the oil through the opening at the top of the gear chamber 76 after first, of course, removing the cover 680. The oil overflows from the gear chamber through the opening 80 and drops into the lubricating pump reservoir 580. Suitable glazed sight openings, not shown, may be provided in the lubricating pump reservoir cover plate 582 so that the level of the oil in the reservoir may be readily determined. In addition, the cover plate may be provided with a plugged opening 682 as shown in Fig. 4 so that upon removal of the plug, the reservoir 580 may be drained. With the structure of the lubricating system described above, it is seen that lubricating oil is positively pumped into the gear chamber and to the ways of the apparatus during each advance and return stroke of the sliding head unit. Any excess oil in the gear chamber merely overflows through the aperture 80 and returns to the lubricating oil reservoir. It should be noted that the gear chamber never will become completely dry since the aperture 80 is located above the bottom of the chamber. Furthermore, it should be noted that the various conduits of the lubricating system may be easily serviced without draining the entire system as a result of the particular placement of the check valves.

*Control means and electric circuit*

Referring particularly to Fig. 8, it will be seen that the present invention contemplates the use of a plurality of slidable machine tool units of the type described hereinbefore, which units have been designated 40a, 40b and 40c. The units 40a and 40b are adapted for horizontal reciprocation upon the base 42 and the unit 40c is vertically reciprocable upon suitable support means, not shown. These sliding units or heads must be shifted toward and away from a work supporting fixture 690, indicated by broken lines in Fig. 8, in proper timed relationship, and the timed functioning of these sliding heads will become more apparent from the description of the electric circuit which follows. A stationary control bar 692 which is shown in Figs. 1 and 3a is provided for each of the sliding head units and is mounted to the base by any suitable means. Each bar serves as a support for a plurality of control dogs and limit switches. More specifically, a control dog 694 is provided for actuating the above described cam 454 of the control valve structure for shifting the main control valve stem to the feed position and a switch device 696 which is operated by a cam 698 on the sliding head is provided for energizing the solenoid 428 which operates the pilot valve stem 346 in a manner so that the main valve stem is shifted to the reverse position. In addition, a safety device in the form of a dog 700 is provided for engaging the cam 454 and shifting the main valve stem to a neutral position in the event of a failure of the operation of the switch 696 or the electrical circuit to be described. Still, another dog 702 is mounted on the bar for engaging the cam 464 to shift the main valve stem to the neutral position at the end of the reverse stroke. A limit switch 704 which is operated by a cam 706 on the sliding head is also provided for opening the electric circuit described below and deenergizing the reverse solenoid 428 when the sliding head reaches its home position.

The electrical control means which cooperates with the hydraulic circuit in controlling the timed functioning of the sliding heads is shown in Figs. 8, 9 and 35. This means includes a single control panel generally designated by the numeral 708 which may be mounted on the base in any position most convenient to the operator. As shown best in Fig. 8 this single control panel is utilized for controlling all three of the sliding heads. The electric circuit includes electric power lines L–1, L–2, and L–3 connected through suitable magnetic controllers 710 to the prime mover of each sliding head, said prime movers being diagrammatically shown and designated as Nos. 1, 2 and 3 in Fig. 35. A number of push buttons 712, 714 and 716 are employed, each of said buttons being companion to one of the prime movers. For purposes of clearness, the buttons 712 in Fig. 9 are designated by No. 1, the buttons 714 by No. 2 and the buttons 716 by No. 3, to indicate the prime movers or motors which these buttons control. The arrangement is such that the upper button in each instance initiates operation of its associated motor and the lower button stops the operation thereof. This action is effected by closing and opening the corresponding magnetic controllers 710 by suitable button operated magnets, and inasmuch as such controls are conventional, the specific electrical control circuit for these operations have not been illustrated.

Two heavy duty push buttons 718 and 720 marked "Start" and "Reverse" are incorporated in the control panel for the purpose of operating the individual sliding head machine tool units or any number of units as a group, the shifting of each unit being dependent on whether the prime mover for such unit is in operation. More specifically, if the push button 712 is operated to close the magnetic controller 710 and thereby energize the No. 1 prime mover, the start and reverse push buttons will then remotely control the machine tool unit or head 40a. Likewise, by manipulating either of the buttons 714 or 716 the heads 40b and 40c, respectively, may be remotely controlled through the agency of the start and reverse buttons. If all of the groups of buttons 712, 714 and 716 are manipulated for energizing their respective motors, all of the heads may be controlled in unison by the start and reverse buttons. This arrangement is extremely simple and provides a control which is readily understandable by any operator. It is well known that many cutting tools cannot withstand the stopping of the prime mover without causing the cutting edge to break. Therefore, if some unforeseen emergency arises, the operator may merely reverse all of the sliding heads together and thereby preserve the cutting tools. In Fig. 35, the preferred wiring arrangement to be used for the remote control circuit is shown. It is seen that the main power lines L–1, L–2, and L–3 are selectively connected to the various motors No. 1, No. 2 and No. 3 through the magnetic controllers 710 adapted to be operated by the push buttons 712, 714 and 716 as previously described. These controllers and their usual associated holding circuits are of commercial design and well known to those skilled in the art and hence, need no further description.

The control circuit illustrated in Fig. 35 for controlling the hydraulic shifting of the several head frame structures will now be described. As previously stated, the solenoid 426 of the control valve structure is adapted to actuate the pilot valve 344 so that the main valve stem is shifted to the rapid advance or approach position and the solenoid 428 is adapted to operate the pilot valve 346 so that the main valve stem is shifted to the rapid return position. As also previously stated, the remote control of all the control valve structures is effected from the single control start and reverse buttons 718 and 720. To this end the button 718 when operated energizes a coil 722, the button operating to close the circuit through the coil from the line L–3 to the line L–1 by means of a main switch 724 which must first be closed to condition the electrical control circuits. The coil 722 when energized, closes a set of contacts 726 which, when closed, establish a holding circuit for the coil 722 from the line L–3 through the coil 722, the contacts 726 and auxiliary contacts 728 respectively associated with and closed by the contactors 710, contacts 730 which are now closed, and the magnetic controllers or contactors 710 back to the line L–1. It will be noted that if none of the motors have been energized by the push buttons 712, 714 and 716, then none of the contacts 728 will be closed and the holding circuit of coil 722 is not established. The energization of any motor, however, will establish the holding circuit. The operation of the coil 722 also closes switch contacts 732, one for each sliding head structure, and these contacts individually energize their associated solenoid 426 of the control valve structures by closing the circuit from the line L–3 through the magnetic contactors 710, the contacts 732, contacts 734 which are now closed, the solenoids 426, and the contactors 710 back to the line L–1. It will be seen that the solenoid 426 for each head structure operates to shift the control valve to the rapid advance position only if the magnetic controller 710 for such head is closed.

As each head structure moves from its rearmost or home position, the switches 730 and 734 are opened and switch 736 is closed. The opening of the switches 730 and 734 breaks the holding circuit for the coil 722 and also deenergizes the solenoids 426. The deenergization of coil 722 opens contacts 726 and 732.

The contactor switch 730 which is companion to each unit is broken upon movement thereof, and, therefore, when the units as a group have been started in their forward direction and all contactors 730 have been opened, the holding contact 726 causes the coil 722 to be deenergized. The above arrangement is necessary because of the fact that the main valve stem 340 of the control valve structure is actuated from its forward position to its feed position by a mechanical control dog arrangement, and if the solenoid is not deenergized prior to such movement to the feed position, the main valve stem will again move into the forward position.

As the contacts 730 and 734 are open, the contacts or switches 736 are simultaneously closed so that when switches 696 are closed at the end of the feeding operation, a circuit will be established from the line L–3 through the contactors 710, switches 696, contacts 736, solenoids 428 and the contactors 710 back to the line L–1. The energization of the solenoids 428 of the control valve structure causes shifting of the main control valve stem to the rapid reverse position in the manner previously set forth. The reverse solenoid 428 may also be operated at any time after the closing of switches or contacts 736 by the reverse control button 720. This control button is adapted to close a circuit through a coil 738 from the line L–3 through the coil 738, switch 720 and main switch 724 back to the line L–1. The energization of the coil 738 closes contacts 742 which, if switches 736 are closed, complete a circuit from the line L–3 through contactors 710, switches 742, switches 736, solenoids 428 and contactors 710 back to the line L–1. As the head structures are individually restored to home position, the limit switches 704 function to open switches 736 slightly before control dogs shift the main valve stems of the control valve structure to a neutral position.

From the above description, it is apparent that the manual control buttons indicated as start and reverse are employed for the purpose of remote control of all of the sliding head units provided that all of the magnetic controllers 710 are properly in an engaged position. The solenoids 428 are not only used with the reversed button control arrangement, but are also used in conjunction with the individual reversal of each unit in combination with the switches 696. It is also apparent that in the event of an emergency the operator need only push the reverse button to cause all of the sliding head units to be automatically reversed to their starting positions.

*Statement of operation*

Assuming the sliding head frame structures all to be in home or withdrawn position, the operator initiates operation of the machine by first closing the main switch 724 to energize the electrical control circuit. The upper push buttons of the sets of buttons 712, 714 and 716 are then operated to energize the motors or prime movers of the headframe structures or units 40a, 40b and 40c. If all of the sliding units are to be operated all three of the push buttons will be closed. The operation of the push buttons closes the magnetic contactors, initiating the operation of the motors and closing their corresponding conventional motor holding circuits, not shown. As the motors begin, the traverse pump structures 110 and feed pumps 112 associated therewith begin the circulation of the hydraulic actuating fluid. At this time, the individual control valve structures are in neutral position so that the fluid delivered by the pumps is merely idly circulated.

The operator then actuates the start button or switch 718 which causes energization of the coil 722 and closing of the contacts 726 and 732 since the magnetic contactors 710 and their associated auxiliary switches 728 have been closed, whereby the holding circuit for the coil 722 is established. The closing of the contacts 732 causes the energization of the forward solenoid 426 for each unit which has been energized. The solenoids 426 function to shift the control valve structures to the rapid advance position in the manner fully set forth above. Thus, fluid is directed from the rapid traverse and feed pumps through the control valve structures and to the hydraulic cylinders to effect rapid advance or approach movement of the sliding heads. As the head structures move away from home position the solenoids 426 are deenergized and the holding circuit for the coil 722 is also deenergized. As the heads reach their feed position, their associated control dogs cause the mechanical shifting of the main valve stems 340 into the feed position wherein fluid from the rapid traverse pumps is cut off from the hydraulic cylinders and the cylinders are actuated at a slower rate by fluid from the feed pumps. At the end of the feeding stroke the limit switches 696 are actuated to energize the reverse solenoids 428 which cause the main valve stems to shift to the reverse position. Fluid is now circulated from the rapid traverse pump to the hydraulic cylinders to effect rapid reverse movement. As the head frames return to the home position the switches 736 are opened to deenergize the solenoid 428 and the switches 730 and 734 are closed. However, the closing of the switches 730 and 734 does not energize the forward solenoids 426 due to the fact that switches 732 and 726 have been previously opened and cannot be reclosed except by another operation of the main start button. Immediately after the opening of the switches 736 and as the head frames reach home position, the control dogs 702 function to shift the main valve stems of the control valve structures to neutral position.

While the preferred embodiment of the present invention has been shown and described herein, it is obvious that many structural details may be changed without departing from the spirit and scope of the appended claims.

The invention is claimed as follows:

1. A self-contained machine tool unit comprising a head frame adapted to be slidably mounted on a base, said head frame including an internal hydraulic fluid reservoir, a fluid motor connected with said head frame for actuating said head frame, a rapid traverse pump mounted against a first surface of said head frame above said reservoir, a feed pump mounted against a second surface of said head frame above said reservoir, drive means on said head frame having a first connection with said rapid traverse pump and a separate connection with said feed pump so that each pump may be selectively serviced without disturbing the other pump, control valve means mounted against a third surface of said head frame, and passageway means integrally formed in said head frame and connecting said pumps, said valve means and said fluid motor, said passageway means having ports opening at said surfaces and aligned and communicating directly with mating ports of said pumps and said valve means.

2. A self-contained machine tool unit comprising a head frame adapted to be slidably mounted on a base, said head frame including an internal hydraulic fluid reservoir, a rapid traverse pump mounted against a first surface of said head frame above said reservoir, a feed pump mounted against a second surface of said head frame above said reservoir, drive means on said head frame having a first connection with said rapid traverse pump and a separate connection with said feed pump so that each pump may be selectively serviced without disturbing the other pump, control valve means mounted against a third surface of said head frame, a fluid motor connected with said head frame for actuating the head frame, said fluid motor including a hydraulic cylinder mounted against a fourth surface of said head frame, and passageway means integrally formed in said head frame and connecting said pumps, said valve means and said hydraulic cylinder, said passageway means having ports opening at said surfaces and aligned with and communicating directly with mating ports of said pumps, said valve means and said hydraulic cylinder.

3. A self-contained machine tool unit comprising a head frame adapted to be slidably mounted on a base, said head frame including an internal hydraulic fluid reservoir, a fluid motor connected with said head frame for actuating said head frame, a rapid traverse pump mounted against a first surface of said head frame at one side thereof and above said reservoir, a feed pump mounted against a second surface of said head frame at an opposite side thereof and above said reservoir, drive means on said head frame and including a portion traversing said head frame and having a first connection with said rapid traverse pump and a separate connection with said feed pump so that each pump may be selectively serviced without disturbing the other pump, control valve means mounted against a third surface of said head frame, said pumps and said control valve means including body members having fluid passageways integrally formed therein and opening at ports facing their associated surfaces, and passageway means integrally formed in said head frame and connecting said pumps, said valve means and said fluid motor, said passageway means having ports opening at said surfaces and aligned with and communicating directly with said first mentioned ports of said pumps and said valve means.

4. A self-contained machine tool unit comprising a head frame adapted to be slidably mounted on a base, said head frame including an internal hydraulic fluid reservoir and a separate lubricating oil reservoir, a fluid motor connected with said head frame for actuating the head frame, a rapid traverse pump mounted against a first surface of the head frame above said fluid reservoir, a feed pump mounted against a second surface of said head frame above said fluid reservoir, drive means on said head frame having a first connection with said rapid traverse pump and a separate connection with said feed pump so that each pump may be selectively serviced without disturbing the other pump, control valve means mounted against a third surface of said head frame, passageway means integrally formed in said head frame and connecting said pumps, said valve means and said fluid motor, said passageway means having ports opening at said surfaces and aligned with and communicating directly with mating ports of said pumps and said valve means, a lubricating oil pump mounted on said head frame, and additional passageway means within said head frame connecting said oil reservoir, said lubricating pump and areas of the unit to be lubricated.

5. A self-contained machine tool unit, as defined in claim 4, wherein at least a portion of said additional passageway means is integrally formed in said head frame.

6. A self-contained machine tool unit comprising a head frame adapted to be slidably mounted on a base, said head frame including an internal hydraulic fluid reservoir, said head frame including an internal lubricating oil reservoir for maintaining oil at a predetermined level, a fluid motor connected with said head frame for actuating the head frame, drive means on said head frame and including a drive shaft traversing said head frame above said predetermined level, said drive means including gear means in said oil reservoir for driving said shaft and projecting below said level, a rapid traverse pump mounted against a first surface at one side of said head frame above said level and connected with one end of said drive shaft, a feed pump mounted against a second surface at an opposite side of said head frame and above said level and connected with an opposite end of said drive shaft, control valve means mounted against a third surface of said head frame, and passageway means integrally formed in said head frame and connecting said pumps, said valve means and said fluid motor, said passageway means having ports opening at said surfaces and aligned with and communicating directly with mating ports of said pumps and said valve means.

7. A self-contained machine tool unit comprising a head frame adapted to be slidably mounted on a base, said head frame including an internal hydraulic fluid reservoir, said head frame including an internal lubricating oil reservoir, a fluid motor connected with said head frame for actuating the head frame, drive means on said head frame and including a drive shaft traversing said head frame and said lubricating oil reservoir, said drive means including gear means in said oil reservoir for driving said shaft and projecting for contact with lubricating oil in the oil reservoir, a rapid traverse pump mounted against a first surface at one side of said head frame and above said hydraulic fluid reservoir and said oil reservoir, a feed pump mounted against a second surface at an opposite side of said head frame and above said fluid reservoir and said oil reservoir, said pumps respectively being connected with opposite ends of said drive shaft, a control valve means mounted against a third surface of said head frame, and passageway means integrally formed in said head frame and connecting said pumps, said valve means and said fluid motor, said passageway means having ports opening at said surfaces and aligned with and communicating directly with mating ports of said pumps and said valve means.

8. A self-contained machine tool unit compriisng a head frame adapted to be slidably mounted on a base, said head frame including an internal hydraulic fluid reservoir, said head frame including an internal lubricating oil reservoir for maintaining oil at a predetermined level, a fluid motor connected with said head frame for actuating the head frame, drive means on said head frame and including a drive shaft traversing said head frame above said predetermined level, said drive means including gear means in said oil reservoir for driving said shaft and projecting below said level, a rapid traverse pump mounted against a first surface at one side of said head frame above said level and connected with one end of said drive shaft, a feed pump mounted against a second surface at an opposite side of said head frame and above said level and connected with an opposite end of said drive shaft, control valve means mounted against a third surface of said head frame, and hydraulic fluid passageway means in said head frame integrally formed in said head frame and connecting said pumps, said valve means and said fluid motor, said hydraulic fluid passageway means having ports opening at said surfaces and aligned with and communicating directly with mating ports of said pumps and said valve means, lubricating oil passageway means integrally formed in said head frame, chamber means integrally formed in said head frame and communicating with a portion of said lubricating oil passageway means and with a portion of said hydraulic fluid passageway means, and a pressure actuated lubricating oil pump mounted in said chamber means for actuation by changes of pressure in said hydraulic fluid passageway means for distributing lubricating oil through said oil passageway means.

References Cited in the file of this patent
UNITED STATES PATENTS

| | | |
|---|---|---|
| 2,023,842 | Kingsbury | Dec. 10, 1935 |
| 2,095,286 | Riach | Oct. 12, 1937 |
| 2,232,620 | Meeks | Feb. 18, 1941 |
| 2,266,829 | Svenson | Dec. 23, 1941 |
| 2,310,078 | Herman | Feb. 2, 1943 |
| 2,388,716 | Svenson | Nov. 13, 1945 |
| 2,403,913 | Ellis | July 16, 1946 |
| 2,409,517 | Schmit | Oct. 15, 1946 |
| 2,463,003 | Stacy | Mar. 1, 1949 |
| 2,559,125 | Lee | July 3, 1951 |
| 2,594,664 | Livers et al. | Apr. 29, 1952 |
| 2,605,108 | Stephens | July 29, 1952 |
| 2,679,727 | McLeod | June 1, 1954 |